(12) United States Patent
Matsuda

(10) Patent No.: US 6,247,663 B1
(45) Date of Patent: Jun. 19, 2001

(54) REEL FOR FISHING

(75) Inventor: Kazuyuki Matsuda, Tokyo (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 09/389,338

(22) Filed: Sep. 2, 1999

(30) Foreign Application Priority Data

Sep. 2, 1998 (JP) .................................................. 10-263969
Nov. 5, 1998 (JP) .................................................. 10-330171

(51) Int. Cl.⁷ .................................................. A01K 89/01
(52) U.S. Cl. .......................................... 242/231; 242/261
(58) Field of Search .................................... 242/228, 230, 242/231, 232, 234, 257, 259, 260, 261, 262, 270

(56) References Cited

U.S. PATENT DOCUMENTS

| | | | | |
|---|---|---|---|---|
| 2,198,257 | * | 4/1940 | McMahon | 242/260 |
| 4,202,508 | * | 5/1980 | Ishida et al. | 242/231 |
| 4,256,271 | * | 3/1981 | Ruin | 242/232 |
| 4,403,750 | * | 9/1983 | Morimoto | 242/232 |
| 4,502,645 | * | 3/1985 | Sazaki et al. | 242/231 |
| 4,513,926 | * | 4/1985 | Tsunoda et al. | 242/231 |
| 4,697,760 | * | 10/1987 | Aoki | 242/261 |
| 4,899,952 | * | 2/1990 | Aoki | 242/260 |
| 4,921,187 | * | 5/1990 | Yamaguchi et al. | 242/232 |
| 4,923,140 | * | 5/1990 | Yamaguchi et al. | 242/230 |
| 4,941,626 | * | 7/1990 | Carlsson | 242/231 |
| 5,342,003 | * | 8/1994 | Sugawara et al. | 242/231 |
| 5,358,197 | * | 10/1994 | Sakaguchi | 242/261 |
| 5,467,933 | * | 11/1995 | Miyazaki | 242/261 |
| 5,683,049 | * | 11/1997 | Kawabe et al. | 242/232 |
| 5,755,390 | * | 5/1998 | Ban | 242/231 |
| 5,820,052 | * | 10/1998 | Yamaguchi et al. | 242/232 |
| 5,820,053 | * | 10/1998 | Takeuchi et al. | 242/231 X |
| 5,850,979 | * | 12/1998 | Murayama et al. | 242/261 X |
| 5,988,546 | * | 11/1999 | Young | 242/232 |

FOREIGN PATENT DOCUMENTS

| | | | | |
|---|---|---|---|---|
| 585947 | * | 3/1994 | (EP) | 242/230 |
| 2257004 | * | 1/1993 | (GB) | 242/232 |
| 2257342 | * | 1/1993 | (GB) | 242/231 |
| 2780 | | 1/1980 | (JP) . | |
| 43017 | | 10/1992 | (JP) . | |
| 405003741 | * | 1/1993 | (JP) | 242/231 |

* cited by examiner

Primary Examiner—Emmanuel M. Marcelo
(74) Attorney, Agent, or Firm—Liniak, Berenato, Longacre & White

(57) ABSTRACT

An operating member (6) having a shaft portion fitted with the lever (23) of a clutch operating mechanism is provided with a moving guide portion (6b) including an eccentric mating portion (6a) and an arcuate long hole. One end portion (7a) of an urging member (7) including a dead point spring is inserted into and mated with the moving guide portion (6b), whereas the other end portion (7b) is inserted into and mated with a hole 1d bored in a side frame (1b). The dead point exists on a line a connecting the center of the operating member (6) and the center of the other end portion (7b) of the urging member (7). In the winding condition of a fishline, the operating member (6) is pivoted clockwise and the one end portion of the urging member (7) is mated with the end of the clockwise direction within the moving guide portion (6b). In the playing-out condition of the fishline, the operating member (6) is pivoted counterclockwise and the one end portion (7a) of the operating member (7) is displaced to and mated with the end of the counterclockwise direction within the moving guide portion (6b).

19 Claims, 16 Drawing Sheets

REEL FOR FISHING

BACKGROUND OF THE INVENTION

1. Field of the Invention

This invention relates to an improved reel for fishing such that the urging force of an urging member deriving from dead point action is strongly acted on an operating member during its operation.

2. Description of the Related Art

Heretofore, an urging member to which urging force is applied because of a dead point action has been incorporated in a clutch operating mechanism for switching on/off the coupling of the spool shaft of a double-bearing type reel for fishing to a driving mechanism or a bail-reversing mechanism in a spinning reel for fishing.

A clutch operating mechanism in a double-bearing type reel for fishing is turned on and off by actuating a clutch plate retaining a pinion that is axially and movably fitted in a spool shaft by linearly or rotatively moving a slide plate fitted with a cam and a clutch lever, and rotating a handle. Such a clutch operating mechanism is also provided with an urging member between the slide plate as well as the clutch lever and a reel frame.

As the distance of moving the clutch plate operated by the cam is limited in the clutch operating mechanism, it is difficult to have urging force acted on strongly in the conventional urging mechanism. If the handle is rotated with the inertia force at the time of casting a terminal tackle, the clutch operating mechanism tends to become easily actuated, thus causing error resetting. If the urging force is acted strongly by increasing the thickness of the spring material, the operating force also unnecessarily increases, thus worsening the operability.

In a bail reversing mechanism in a spinning reel for fishing, a bail supporting member has a fishing guide portion in the forepart of the support arm of a rotor whose rotation is interlocked with the rotation for winding of a handle. The bail supporting member is reversibly assigned to one of the winding and playing-out conditions of a fishline by urging and holding the bail supporting member with the urging member. When the fishline is played out to a predetermined point, a bail is reversed to the playing-out position and then a terminal tackle is sent in the distance by bringing down the fishline together with a fishing rod.

In order to prevent the error reset of the bail to the winding condition of the fishline due to momentum or unnecessary rotation of the rotor during the fishline playing-out operation, Japanese Utility Model Publication No. 2780/1980, for example, discloses an adjusting member for adjusting the urging force of a bail so as to prevent the error reset of the bail to the winding condition of the fishline during the fishline playing-out operation by increasing the holding force when the bail is reversed to the playing-out condition of the fishline. Further, there is a known arrangement as disclosed in Japanese Utility Model Publication No. 43017/1992 wherein a bail is urged toward and held in the playing-out position of a fishline by installing an urging spring on one side of a rotor supporting arm.

In the case of the former utility model, however, the construction becomes complicated and mounting the adjusting member on one side of rotor supporting arm tends to deteriorate the rotative balance of the rotor. Moreover, the fishline becomes easily entangled because the adjusting member protrudes from the surface of the rotor supporting arm.

The problem in this case is that when the bail is reversed to the playing-out condition of the fishline, it becomes heavier to the extent that the overall urging force has been increased and this results in lowering the operability.

In the latter case, due to an arrangement for deviating the urging spring to one side of the rotor supporting arm, strongly urging and holding the bail in the playing-out position of the fishline is restricted in consideration of the shape, size and the like of the rotor supporting arm and the bail supporting member. Consequently, the problem of urging and holding the bail in the playing-out condition of the fishline still remains to be solved.

Thus, in the conventional mechanism for preventing the error resetting, problems making the arrangement complicated, deteriorating the rotative balance of the rotor, allowing the fishline to become easily entangled because of the protrusion of the rotor supporting arm from the surface, and lowering the operability are included.

SUMMARY OF THE INVENTION

In view of the foregoing drawbacks, an object of the present invention is to provide a reel for fishing so as to have urging force acted on strongly without increasing operating force with a simple construction to ensure that error resetting is prevented.

To attain the above object, according to a first aspect of the invention, there is provided a reel for fishing, including a moving guide portion which is provided on at least one of operating member and reel body sides and capable of displacing the end portion of an urging member so that the urging force of the urging member may be acted strongly on the operating member for actuating one of linear and rotating movements by the urging member to which urging force is applied beyond the dead point through one of the ON and OFF operations of the operating member.

The reel for fishing may be constructed so that the operating member is supported so as to be capable of pivoting; the moving guide portion is in the form of a circular arc groove; and a regulating portion for regulating the movement of the end portion of the urging member is provided on both sides of the circular arc groove.

According to a second aspect of the invention, there is provided a reel for fishing wherein a bail supporting member has a moving guide portion in the forepart of the support arm of a rotor rotating in the way interlocked with the rotation of a handle so as to reversibly assign the bail supporting member to one of the winding and playing-out conditions of a fishline by urging and holding the bail supporting member using a spring member. When the bail supporting member is reversed from the winding condition of the fishline to the playing-out condition of the fishline, a moving guide portion is capable of displacing a rotor supporting arm and the end portion of an urging member supported by the bail supporting member is provided to one of the rotor supporting arm and the bail supporting member so that the urging force of the bail supporting member may be acted on strongly.

According to a third aspect of the invention, there is provided a reel for fishing wherein a bail supporting member having a moving guide portion in the forepart of the support arm of a rotor rotating in the way interlocked with the rotation of a handle so as to assign the bail supporting member to one of the winding and playing-out conditions of a fishline by urging and holding the bail supporting member using a spring member. When the bail supporting member is reversed from the winding condition of the fishline to the playing-out condition of the fishline, a rotary pivot is provided to one of the bail supporting member and the rotor supporting arm and that a moving guide portion is capable of diametrically displacing the rotary pivot to one of the rotor supporting arm and the bail supporting member.

DETAILED DESCRIPTION OF THE PREFERRED EMBODIMENTS

Figure 1A:
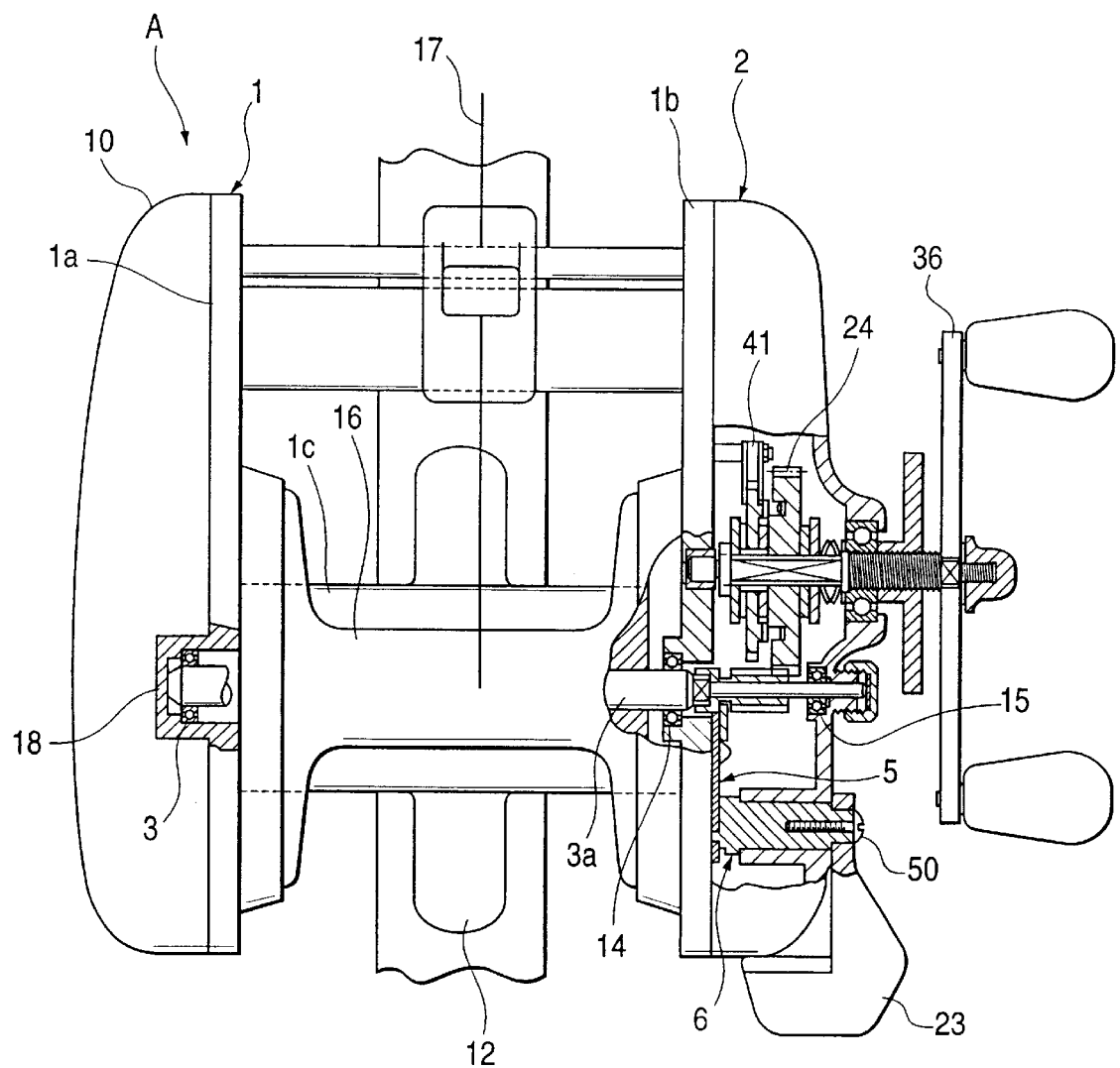
FIG. 1A is a sectional plan view of the main part of a double-bearing type reel for fishing according to a first embodiment of the invention.

Embodiments of the present invention will now be described with reference to the drawings.

First Embodiment

FIGS. 1A–4 refer to a double-bearing type reel for fishing as a first embodiment of the invention.

The reel body A of the double-bearing type reel for fishing is formed with a side frame 1 and reel side plates 10 and 2. The left and right side frames 1a and 1b of the side frame 1 are integrally held in parallel to each other by a plurality of pillars 11 and the fixed plate 1c of a reel leg 12, the reel side plates 10 and 2 being fitted to both the respective side frames 1a and 1b.

Bearings 13 and 14 are provided to the respective side frames 1a and 1b and a bearing 15 is provided to the reel side plate 2 so as to support a spool shaft 3. A spool 16 fixed to the large diameter portion 3a of the spool shaft 3 is rotatably provided between the left and right side frames 1a and 1b.

A fishline 17 is wound on the outer periphery of the barrel portion of the spool 16. One left end of the spool shaft 3 is made to abut against a thrust bearing 18, and so is the other end against a thrust bearing 20 within an adjusting knob 19.

A pinion 4 is slidably fitted to the small diameter portion 3b of the spool shaft 3 within the reel side plate 2. The projected mating portion 3c of the spool shaft 3 and the recessed clutch-engaging portion 4a of the pinion 4 are brought into engagement and disengagement with each other by a clutch plate 21, a slide plate 5, a coupling lever 22 and an operating member 6 including a shaft portion fitted with a clutch lever 23.

A driving gear 24 engages with the cog portion 4b of the pinion 4 and is fitted to a handle shaft 25 in a whirl-stop fashion and prevented from slipping out in one single direction by a washer 26 press-fitted in the handle shaft 25.

A peripheral groove 4c is formed in the outer periphery of the pinion 4, and the clutch plate 21 is mated therewith.

The clutch mechanism is formed with the recessed clutch-engaging portion 4a of the pinion 4 and the projected mating portion 3c of the spool shaft 3. The clutch operating mechanism includes the clutch plate 21 for moving the pinion 4, the slide plate 5, the coupling lever 22 and the operating member 6 including the shaft portion fitted with a clutch lever 23, and an urging member 7 being a dead point spring.

The handle shaft 25 is supported by the bearing 27 of the side frame 1b and the bearing 28 of the reel side plate 2. A brake plate 29 is fitted to the outer periphery of the handle shaft 25 in the whirl-stop fashion on the right side of the washer 26. A friction plate 30, a ratchet 31 and a friction plate 32 are rotatably fitted onto the left side of the driving gear 24. Further, the friction plate 32 is fitted onto the right side of the driving gear 24 simultaneously with a brake plate 33 and plate springs 34 and 34 fitted thereto in the whirl-stop fashion.

The cylindrical portion of a drag-adjusting knob 35 is screwed onto the outer periphery of the handle shaft 25 on the right side of the bearing 28. When the drag adjusting knob 35 is pivoted, the friction plate 30, the ratchet 31, the friction plate 32, the brake plate 33 and the plate springs 34 and 34 are pressed against the side of the driving gear 24 via the bearing 28 so as to regulate the braking force.

A handle 36 is fitted to the other end of the handle shaft 25 in the whirl-stop fashion by screwing on a nut 37.

One end of a sound-producing member 38 formed with a plate spring is fixed to the side of the driving gear 24 and the other side of the sound-producing member 38 is made to face an uneven sound-producing portion 31a formed on the side of the ratchet 31 set opposite to the driving gear 24.

A reverse retaining pawl 41 held between plate springs 40 and 40 is pivotally supported by a shaft 42 outside the ratchet 31. The plate springs 40 and 40 hold both sides of the ratchet 31, and the leading end of the reverse retaining pawl 41 faces a retaining tooth 31b formed on the outer periphery of the ratchet 31 in such a manner as to be capable of engaging with the leading end thereof.

Figure 2:
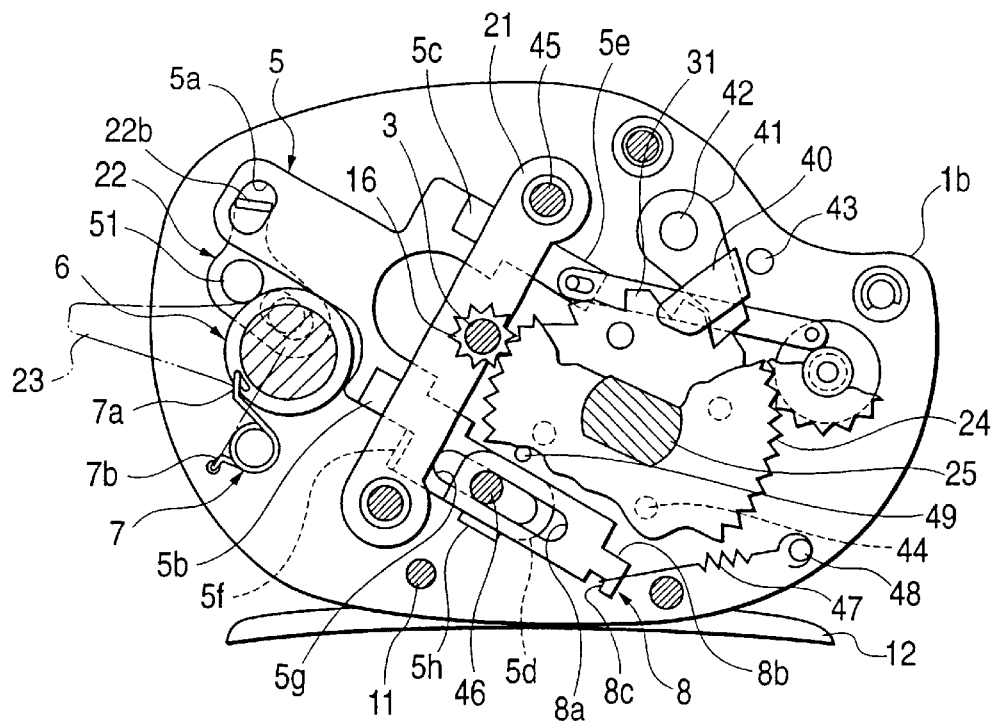
FIG. 2 is a partial sectional side view of the inside of a side plate on the handle side of a clutch in the ON state.

As shown in FIG. 2, a pin 43 for checking the pivoting of the reverse retaining pawl 41 is provided outside the reverse retaining pawl 41. A plurality of kick pins 44 are fixed to the ratchet 31.

Both ends of the clutch plate 21 are respectively fitted to supports 45 and 45 fixed to the side frame 1b, the clutch plate 21 being urged by a spring (not shown) in the direction in which the projected mating portion 3c of the spool shaft 3 engages with the recessed clutch-engaging portion 4a of the pinion 4.

The clutch plate 21 is slid by the slide plate 5, which includes a lateral long hole as a mating portion 5a, cam-like operating portions 5b and 5c for operating the clutch plate 21, forked extended leaves 5d and 5e, a bent mating portion 5f, a long hole 5g made in one extended leaf 5d, and a bent portion 5h on one side of the extended leaf 5d. A pin 46 fixed to the side frame 1b is fitted in the long hole 5g and the pin 46 is further fitted in a long hole 8a bored in a releasing leaf 8 which is stacked on the extended leaf 5d.

A cutout portion 8b and a spring hooking portion 8c are formed in the releasing leaf 8. One end of a spring 47 is hooked on the spring hooking portion 8c, whereas the other end thereof is hooked on a pin 48 fixed to the side frame 1b.

A retaining pin 49 is fixed to the side frame 1b on the other side of the extended leaf 5d and the releasing leaf 8.

Figure 1B:
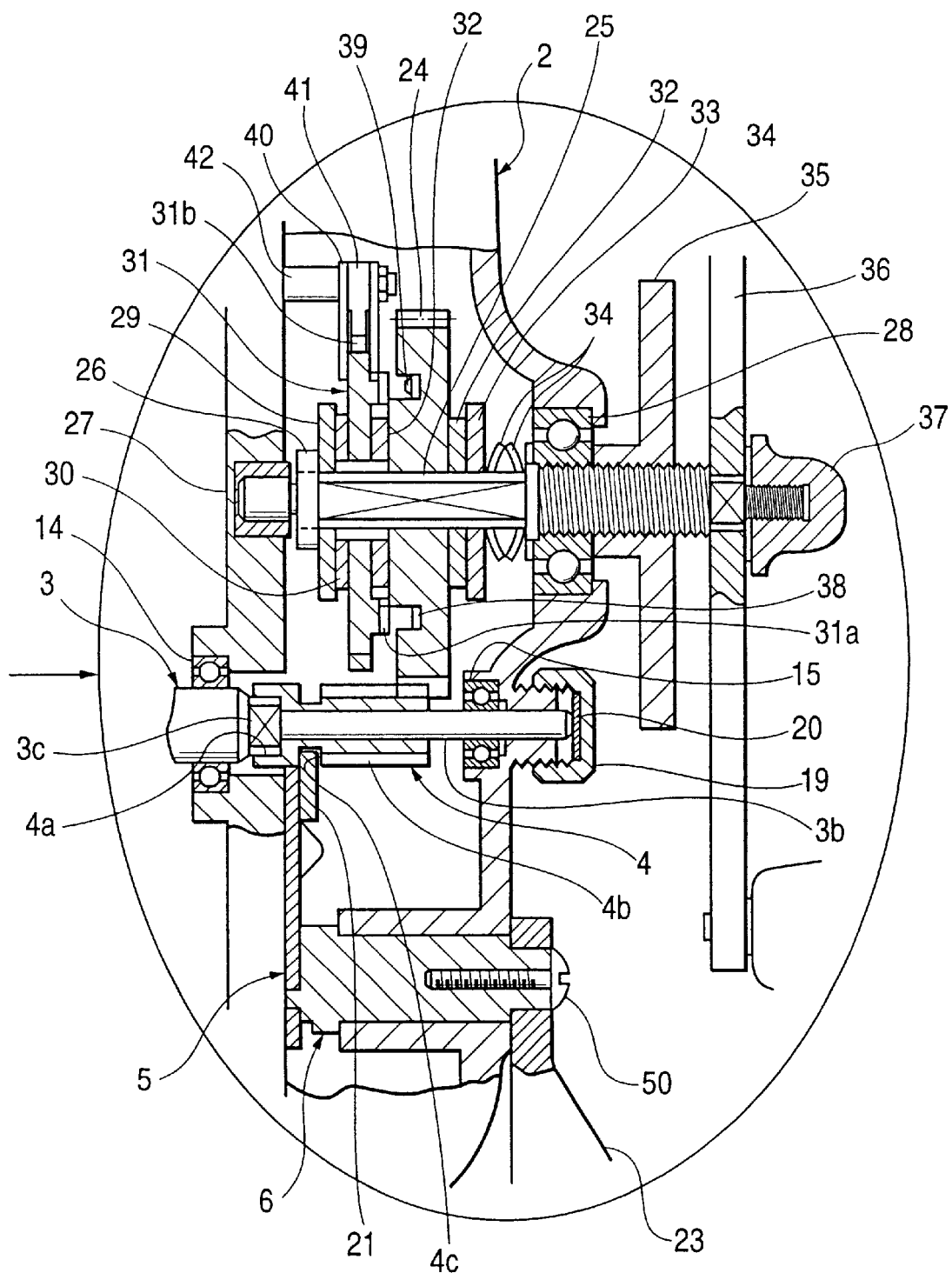
FIG. 1B is an enlarged plan view of the main part of FIG. 1A.

As shown in FIG. 1B, the operating member 6 having the shaft portion fitted with the clutch lever 23 is pivotally supported by the reel side plate 2, the clutch lever 23 being mounted on the operating member 6 with a machine screw 50.

Figure 4:
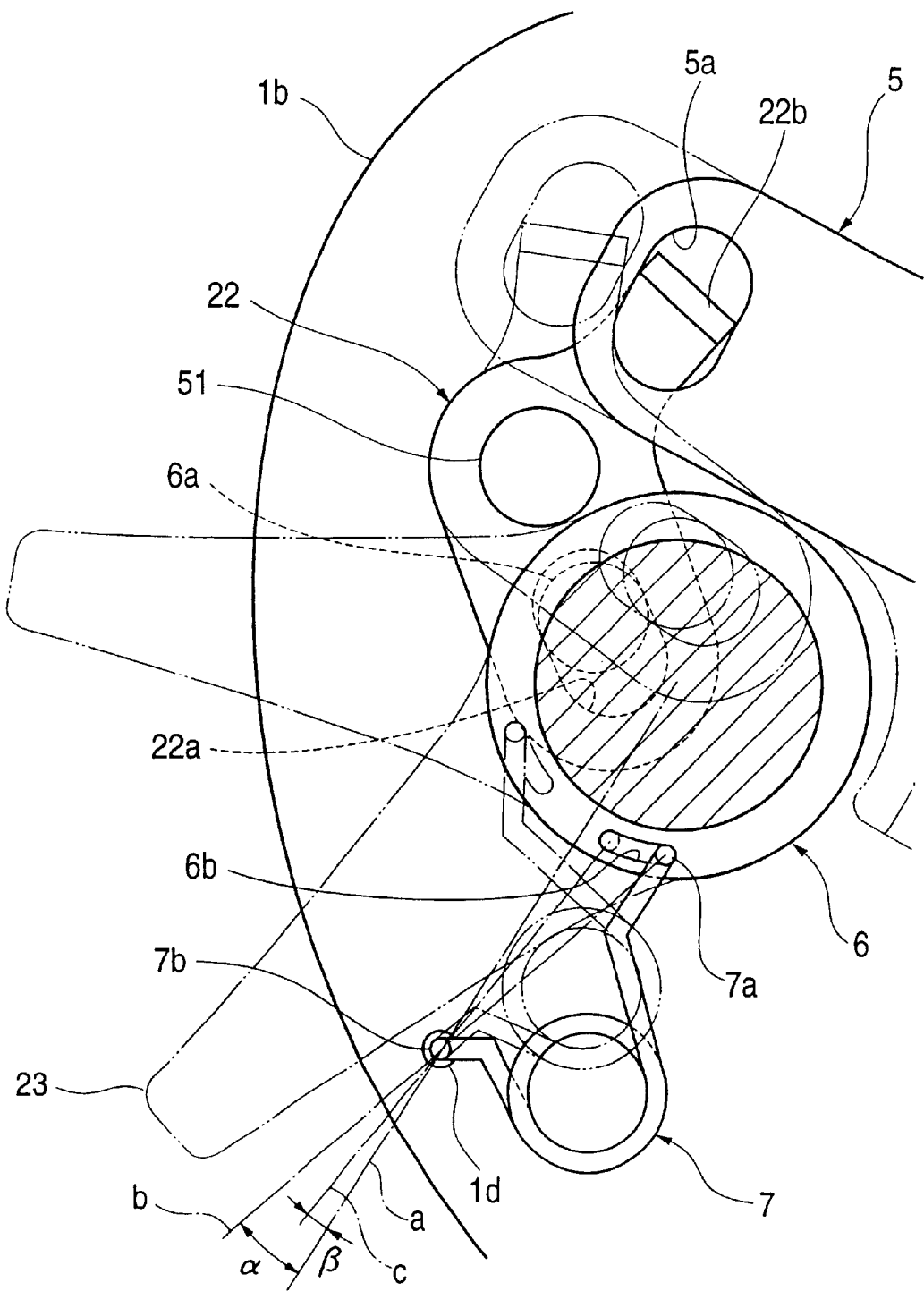
FIG. 4 is an enlarged side view of the main part of the inside of the side plate on the handle side of a clutch operating mechanism.

Further, as shown in FIG. 4, the operating member 6 is provided with an eccentric mating portion 6a and the moving guide portion 6b including the arcuate long groove. Simultaneously, the one end portion 7a of the urging member 7 including the dead point spring is inserted into and mated with the moving guide portion 6b, whereas the other end portion 7b is inserted into and mated with a hole 1d bored in the side frame 1b.

As shown in FIG. 1B, the eccentric mating portion 6a is shown so that it may be inserted into the mating portion 5a of the lateral long hole of the slide plate 5 for simplified illustration.

Figure 3:
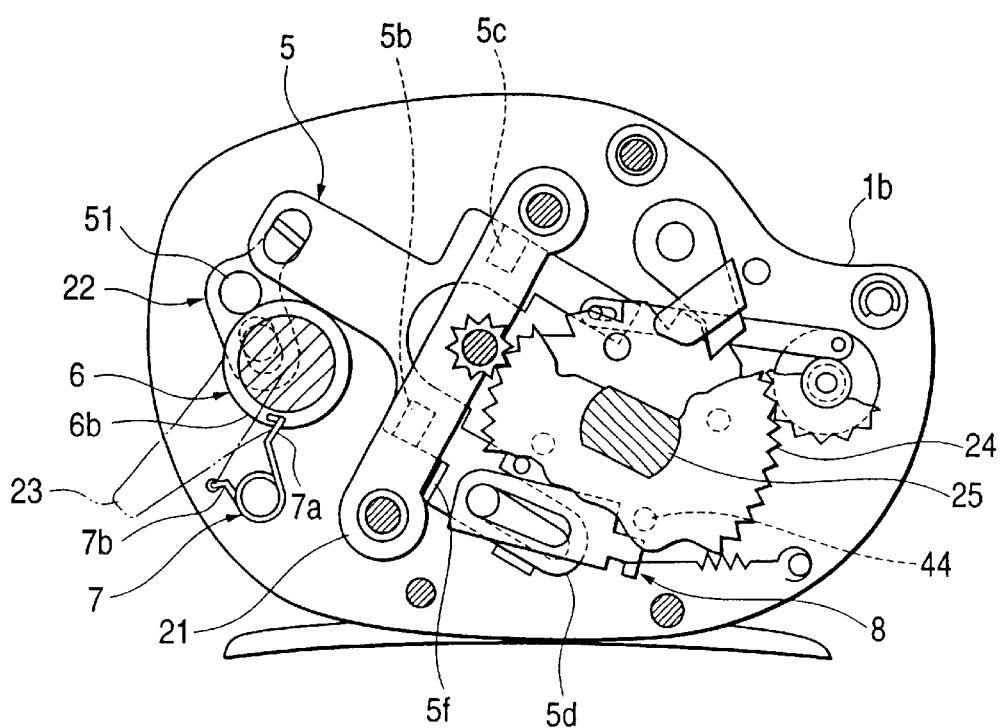
FIG. 3 is a partial sectional side view of the inside of the side plate on the handle side of the clutch in the OFF state.

As shown in FIGS. 2–4, the coupling lever 22 is provided between the slide plate 5 and the operating member 6 and pivotally supported by the side frame 1b with a shaft portion 51. Further, a long hole 22a and a bent mating portion 22b are formed, so that the eccentric mating portion 6a is inserted into the long hole 22a. The mating portion 22a is inserted into the mating portion 5a of the lateral long hole of the slide plate 5.

The urging member 7 including the dead point spring is formed so that the wire may be wound in a ring fashion with the one end portion 7a and the other end portion 7b being linearly extended.

As shown in FIGS. 2–4, the dead point exists on a line a connecting the center of the operating member 6 and the center of the other end portion 7b of the urging member 7. In the winding condition of the fishline of FIG. 2, the operating member 6 is pivoted clockwise and the one end portion 7a of the urging member 7 is mated with the end of the clockwise direction in the moving guide portion 6b.

In the playing-out condition of the fishline of FIG. 3, the operating member 6 is pivoted counterclockwise and the one end portion 7a of the urging member 7 is displaced to the end of the counterclockwise direction in the moving guide portion 6b.

In the playing-out condition of the fishline of FIG. 4, b represents a line connecting the centers of the one end portion 7a and of the other end portion 7b of the urging member 7 shown by a solid line, and c represents a line connecting the centers of the one end portion 7a at the end of the clockwise direction in the moving guide portion 6b shown by the solid line (the position of the one end portion of the conventional urging member) and of the other end portion 7b of the urging member 7 shown by a chain double-dashed line.

Given that the pivoting angle of the connecting lines a and b is $\alpha$ and the pivoting angle of the connecting lines a and c is $\beta$, $\alpha > \beta$ is established. Providing the operating member 6 with the moving guide portion 6b including the arcuate long groove causes a large pivoting angle to be secured as the one end portion 7a of the urging member 7 is displaced in the playing-out condition of the fishline, so that the urging force of the urging member 7 can be acted on strongly.

The operation of the double-bearing type reel for fishing will now be described. When the handle 36 is rotated in the ON state of the clutch while the projected mating portion 3c of the spool shaft 3 is engaging with the recessed clutch-engaging portion 4a of the pinion 4, the pinion 4 and the spool shaft 3 are rotated by the driving gear 24, whereby the fishline 17 is wound on the spool 16.

When the ratchet 31 in FIG. 2 is rotated clockwise via the driving gear 24 and the friction plate 32 then, the friction between the ratchet 31 and the plate springs 40 and 40 causes the plate springs 40 and 40 and the reverse retaining pawl 41 to be pivoted counterclockwise. Then the leading end of the reverse retaining pawl 41 is separated from the retaining tooth 31b of the ratchet 31, and the ratchet 31 is rotated integrally with the driving gear 24.

When the spool 16 is reversely rotated because of playing out the fishline 17, further, the driving gear 24 and the ratchet 31 are rotated counterclockwise and the plate springs 40 and 40 and the reverse retaining pawl 41 are pivoted clockwise. The leading end of the reverse retaining pawl 41 is retained by the retaining tooth 31b of the ratchet 31.

When the reverse retaining pawl 41 is thus retained, the ratchet 31 comes to a standstill and only the driving gear 24 is rotated, whereby the other end of the sound-producing member 38 with its one end fixed to the driving gear 24 falls down from the projected side to the recessed side in the uneven sound-producing portion 31a. Consequently, the sound is produced.

When the clutch lever 23 is pivoted downward counterclockwise as shown in FIGS. 3 and 4, the coupling lever 22 is pivoted clockwise by the eccentric mating portion 6a of the operating member 6, and the slide plate 5 is slid downwardly to the right in the mating portions 22a and 5a.

The sliding movement of the slide plate 5 causes the clutch plate 21 to move up with the operating portions 5b and 5c, and the recessed clutch-engaging portion 4a of the pinion 4 is brought into disengagement with the projected mating portion 3c of the spool shaft 3. Consequently, the clutch is turned off and the spool 16 is set free.

As set forth above, the releasing leaf 8 restrained from pivoting by the retaining pin 49 and the bent portion 5h is pivoted by the spring 47 counterclockwise since the extended leaf 5d is also slid downwardly to the right when the slide plate 5 is thus slid. Therefore, the cutout portion 8b of the releasing leaf 8 is moved to a position where it can be brought into contact with the kick pins 44.

When the handle 36 is rotated in the direction of winding the fishline, the driving gear 24 and the ratchet 31 in FIG. 3 are rotated clockwise and the kick pins 44 are brought into contact with the cutout portion 8b of the releasing leaf 8 to push back the releasing leaf 8 to the left. Then the slide plate 5 is moved back as the left end of the releasing leaf 8 forces the bent mating portion 5f of the slide plate 5 upward to release the engagement of the operating portions 5b and 5c with the clutch plate 21, so that the clutch is turned on when the recessed clutch-engaging portion 4a of the pinion 4 is brought into engagement with the projected mating portion 3c of the spool shaft 3.

When the handle 36 is rotated while the clutch is in the ON state, the spool 16 is rotated as the pinion 4 and the spool shaft 3 are rotated, whereby the fishline 17 is wound on the spool 16.

When the clutch lever 23 is pivoted clockwise while the clutch is in the OFF state, the slide plate 5 is slid upward by the operating member 6 and the coupling lever 22, and the clutch is turned on.

Providing the operating member 6 with the moving guide portion 6b including the arcuate long groove as described above causes a large pivoting angle to be secured as the one end portion 7a of the urging member 7 including the dead point spring is displaced in the playing-out condition of the fishline, so that the urging force of the urging member 7 can be acted on strongly. Therefore, the slide plate 5 will be prevented from moving upward even though the rotational force is applied to the handle 36 with the inertia force at the time of casting the terminal tackle.

As it is unnecessary to thicken the wire of the urging member 7, the operability of the operating member 6 is never worsened because unnecessarily greater operating force is not required for the operating member 6.

With the double-bearing type reel for fishing thus arranged as described above, by providing the operating member 6 with the moving guide portion 6b including the arcuate long hole, a large pivoting angle can be secured as the one end portion 7a of the urging member 7 including the dead point spring is displaced in the playing-out condition of the fishline, so that the urging force of the urging member 7 can be acted on strongly with a simple construction. As it is unnecessary to thicken the wire of the urging member 7, unnecessarily greater operating force is not required for the operating member 6 to ensure that error reset of the clutch operating mechanism is made preventable.

Although the one end portion 7a of the urging member 7 has been displaced by the moving guide portion 6b including the arcuate long groove formed in the operating member 6 in the description given above, a moving guide portion including a long groove may be provided in the side frame 1b so as to mate the other end portion 7b with the moving guide portion.

Although it has been arranged that the clutch plate 21 provided in the cam-like operating portions 5b and 5c is operated and that the slide plate 5 is operated by the operating member 6 urged by the urging member 7 in the description given above, cam-like operating portions and a moving guide portion including an arcuate long groove may be installed in a cylindrical portion so as to provide the urging member 7 between the moving guide portion in the cylindrical portion and the side frame 1b.

Although the operating member 6 has been described as a member for creating the linear or rotating movement of the clutch operating mechanism of the double-bearing type reel for fishing, it may be an operating member for operating switches and any other member of a reel incorporating an urging member to which the urging force is applied beyond the dead point.

Second Embodiment

Figure 5:
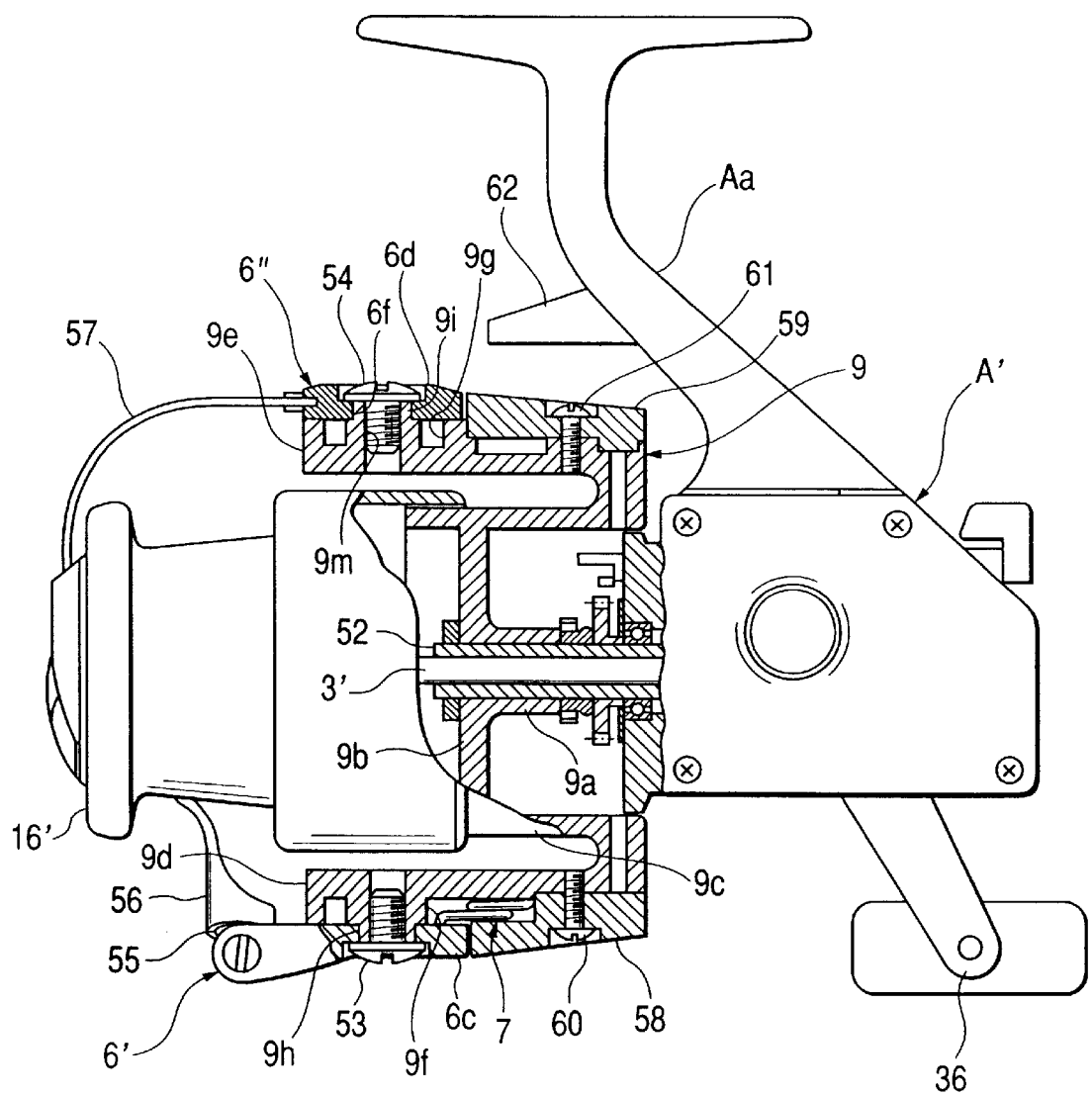
FIG. 5 is a sectional side view of the main part of a spinning reel for fishing according to a second embodiment of the invention.
Figure 6B:
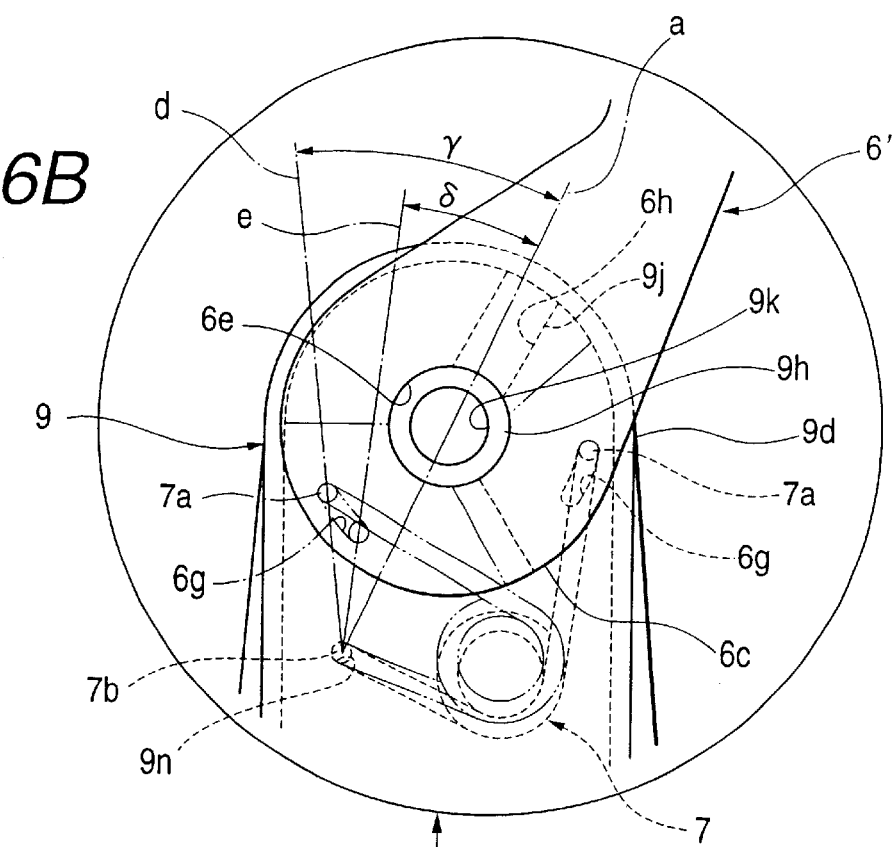
FIG. 6B is a partial enlarged plan view of FIG. 6A with the screws removed.
Figure 6A:
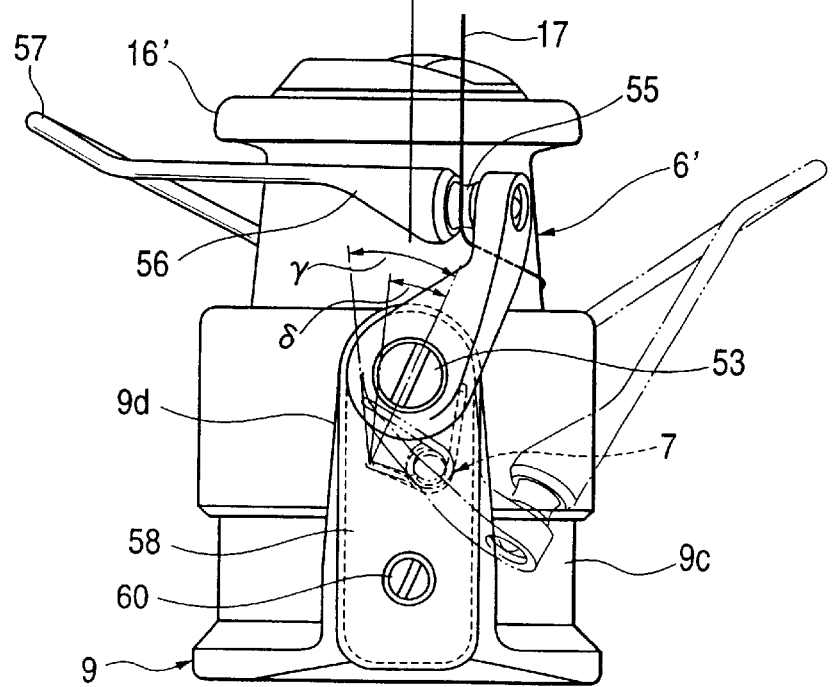
FIG. 6A is a plan view of an operating member including a spool, a rotor and a one-side bail supporting member.

FIGS. 5 to 6B show a spinning reel for fishing as a second embodiment of the invention.

In the spinning reel for fishing, a rotor 9 is fitted to a rotary cylindrical shaft 52 projecting from the front of a reel body A', and a spool 16' is fitted to a spool shaft 3' which is passed through the rotary cylindrical shaft 52 and projects from the front side of the rotor 9.

The rotor 9 is rotated via a driving mechanism (not shown) when the handle 36 is rotated and the spool 16' is longitudinally reciprocated via an oscillating mechanism (not shown) when the handle 36 is rotated.

The rotor 9 is fitted to the rotary cylindrical shaft 52 with a cylindrical portion 9a and formed with a cylindrical portion 9a, a front wall 9b, a large-diameter cylindrical portion 9c, and a pair of support arms 9d and 9e projecting forward from the outer periphery of the base of the large-diameter cylindrical portion 9c. Further, recessed portions 9f and 9g are formed in the respective support arms 9d and 9e; stepped rotary pivots 9h and 9i are formed within the respective recessed portions 9f and 9g; and a colliding portion 9j is formed within the recessed portion 9f of the support arm 9d.

Screw portions 9k and 9m are formed in the respective centers of the rotary pivots 9h and 9i.

Bases 6c and 6d of an operating member 6' including one bail supporting member and an operating member 6" including the other bail support member are pivotally secured on the outsides of the leading end portions of the pair of support arms 9d and 9e of the rotor 9 with screws 53 and 54, a bail being reversible between the winding and playing-out conditions of the fishline 17 as shown by a solid line and a chain double-dashed line of FIG. 6, respectively.

A fishline guiding portion 55 including a line roller and a bail mounting portion 56 are fitted to the leading end portion of the operating member 6' including one bail supporting member.

A bail 57 integral with the bail mounting portion 56 is installed between the bail mounting portion 56 and the leading end portion of the operating member 6" including the other bail supporting member.

The outsides of the pair of support arms 9d and 9e are respectively covered with covers 58 and 59 and fixed with machine screws 60 and 61.

An abutment member 62 against which the operating member 6' including one bail supporting member abuts in the playing-out condition is provided in such a manner as to project from the reel leg portion Aa of the reel body A'.

The bases 6c and 6d of the operating member 6' including one bail supporting member and the operating member 6" including the other bail supporting member are formed into a disk, and through-holes 6e and 6f are bored in the respective disks. The stepped rotary pivots 9h and 9i are fitted in the respective through-holes 6e and 6f and prevented from slipping out with the screws 53 and 54.

A moving guide portion 6g including an arcuate long groove is bored in the back of the base 6c with a bumping projection 6h projecting therefrom.

The one end portion 7a of the urging member 7 being the dead point spring is inserted into and mated with the moving guide portion 6g, whereas the other end portion 7b is inserted into and mated with a hole 9n bored in the support arm 9d.

As shown in FIG. 6B, the dead point exists exits on a line a connecting the center of the operating member 6' including one bail supporting member and the center of the other end portion 7b of the urging member 7.

In the winding condition of the fishline, the moving guide portion 6g, which is shown by a broken line, of the operating member 6' shown by a solid line is situated in the position of the broken line on the right side of the base 6c, and the one end portion 7a of the urging member 7 shown by the broken line is mated with the end of the counterclockwise direction of the moving guide portion 6g.

In the playing-out condition of the fishline, the moving guide portion 6g of the operating member 6' shown by the chain double-dashed line is situated in the position of the chain double-dashed line on the left side of the base 6c of the moving guide portion 6g, and the one end portion 7a of the urging member 7 shown by the chain double-dashed line is displaced to and mated with the end of the clockwise direction of the moving guide portion 6g.

In the playing-out condition of the fishline of FIG. 6B, d represents a line connecting the centers of the one end portion 7a and the other end portion 7b of the urging member 7 shown by the chain double-dashed line, and e represents a line connecting the centers of the one end portion 7a (the position of the one end portion of the conventional urging member) at the end of the counterclockwise direction of the moving guide portion 6g shown by the chain double-dashed line and of the other end portion 7b of the urging member 7.

Given that the pivoting angle of the connecting lines a and d is γ and the pivoting angle of the connecting lines a and e is δ, γ>δ is established. Providing the operating member 6' with the moving guide portion 6g including the arcuate long groove causes a large pivoting angle to be secured as the one end portion 7a of the urging member 7 including the dead point spring is displaced in the playing-out condition of the fishline, so that the urging force of the urging member 7 can be acted on strongly.

The operation of the spinning reel for fishing will now be described. When the handle 36 is rotated in the winding condition of the fishline, the rotor 9 is rotated, whereby the fishline 17 is wound on the spool 16'.

When the winding condition of the fishline is switched to the playing-out condition of the fishline, the bail 57 is manually set up.

When the reel is swung downward with great force in order to cast the terminal tackle (not shown) in the playing-out condition of the fishline, the fishline 17 is played out of the spool 16'.

In order to reverse the bail 57 from the playing-out condition of the fishline to the winding condition of the fishline, the rotor 9 is rotated by the handle 36 and the operating member 6' including the one bail supporting member abuts against the abutment member 62.

As set forth above, by providing the moving guide portion 6g including the arcuate long groove in the back of the base 6c of the operating member 6' including the one bail supporting member, a large pivoting angle can be secured as the one end portion 7a of the urging member 7 including the dead point spring is displaced in the playing-out condition of the fishline, so that the urging force of the urging member 7 can be acted on strongly. Consequently, the bail 57 in the playing-out condition of the fishline is restrained from being reversed to the winding condition of the fishline even when the rotational force is applied to the handle 36 with the inertia force at the time of casting the terminal tackle.

As it is unnecessary to thicken the wire of the urging member 7, the operability of the operating member 6' is never worsened because unnecessarily greater operating force is not required for the operating member 6'.

Moreover, the shaking off of the bail 57 because of the inertia force is also prevented at the time casting the terminal tackle.

With the spinning reel for fishing thus arranged as described above, the operating member 6' including the one bail supporting member is provided with the moving guide portion 6g including the arcuate long groove whereby to secure a large pivoting angle in the playing-out condition of the fishline by displacing the one end portion 7a of the urging member 7 including the dead point spring, so that the urging force of the urging member 7 can be acted on strongly with a simple construction. It is thus ensured to prevent not only error resets of the operating members 6' and 6" respectively including the bail supporting members because of the rotational force applied to the handle 36 with the inertia force at the time of casting the terminal tackle but also the shaking off of the bail 57 because of the inertia force.

Moreover, the operating force of the operating member 6' is not unnecessarily increased and the operability thereof is kept from being worsened because the wire of the urging member 7 need not be thickened.

Third Embodiment

Figure 7:
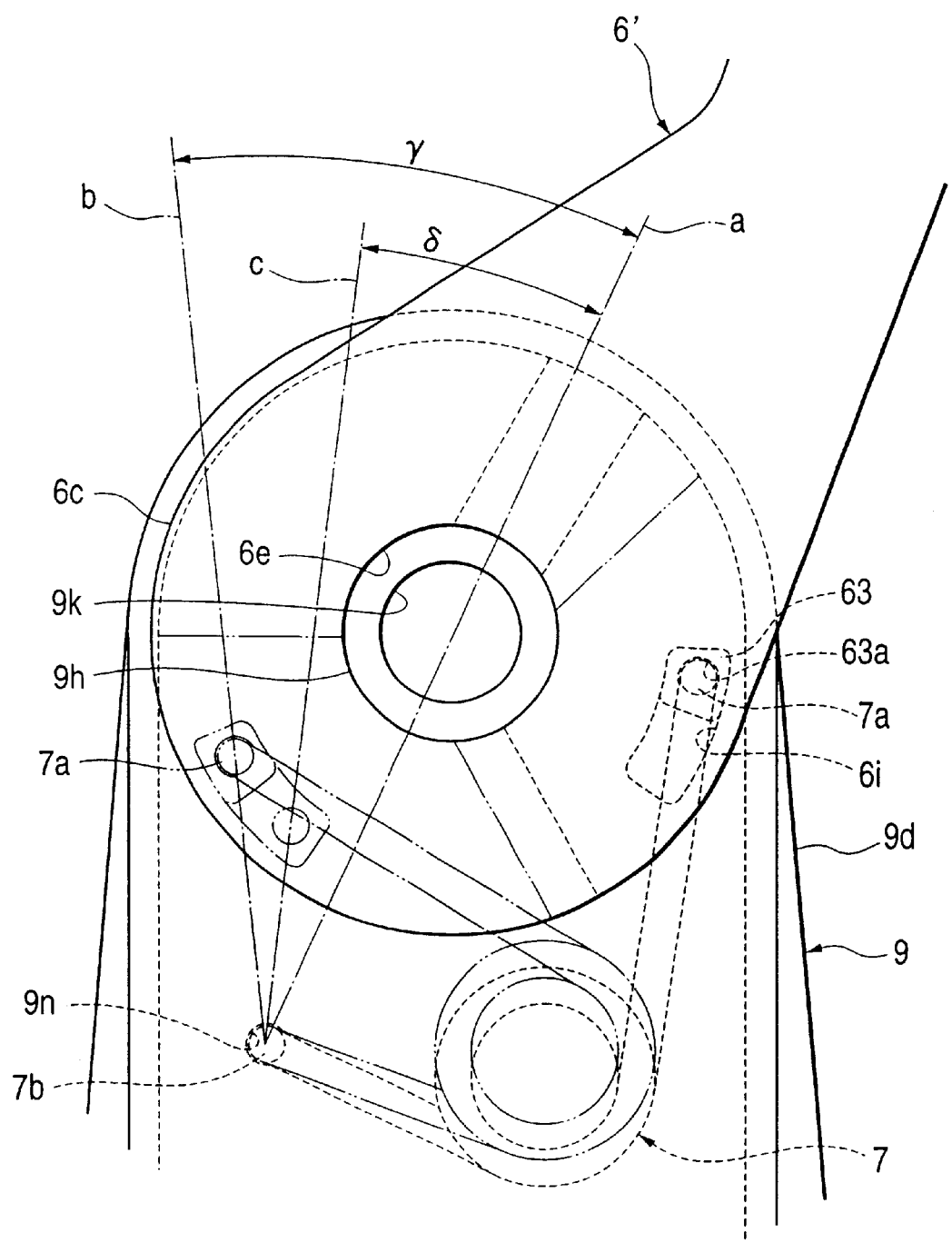
FIG. 7 is an enlarged plan view of the main part including an operating member including one bail supporting member and a support arm according to a third embodiment of the invention.

A description will be given of a third embodiment of the invention with reference to FIG. 7.

According to the third embodiment, a moving guide portion 6i including an arcuate slot wider than the moving guide portion 6g in the second embodiment is bored in the back of the base 6c of the operating member 6' having the one bail supporting member. A moving top 63 is movably inserted into the moving guide portion 6i, and a through-hole 63a is bored in the moving top 63 so that the one end portion 7a of the urging member 7 may be inserted into and mated with the through-hole 63a.

The rest of the arrangement is substantially similar to what has been made in the second embodiment.

Fourth Embodiment

Figure 8B:
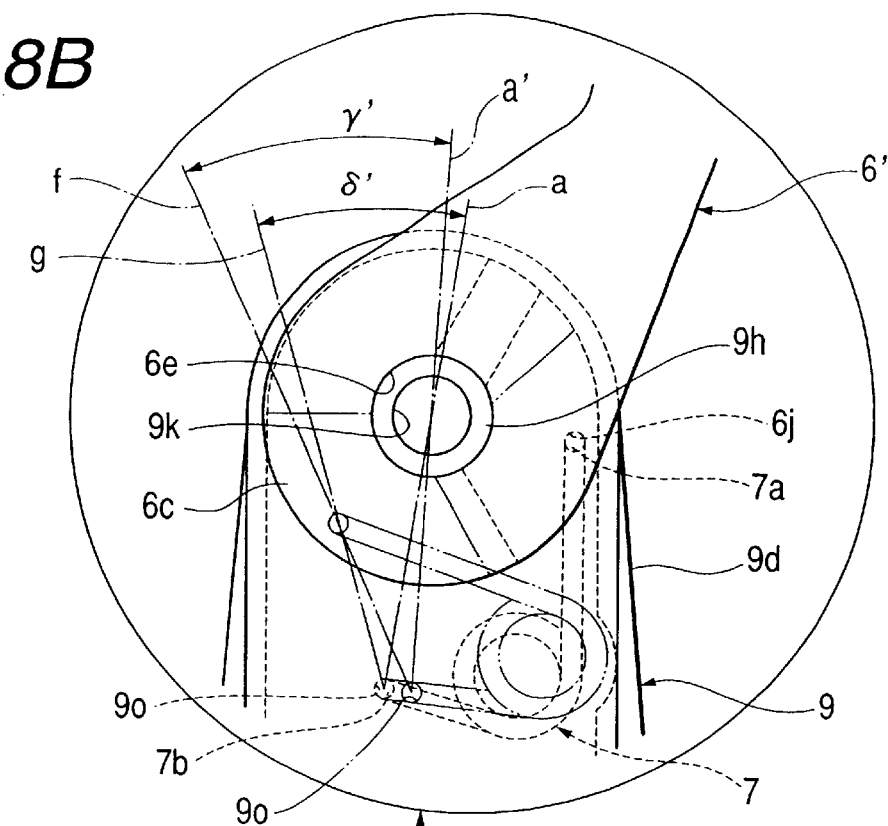
FIG. 8B is a partial enlarged plan view of FIG. 8A with the screws removed.
Figure 8A:
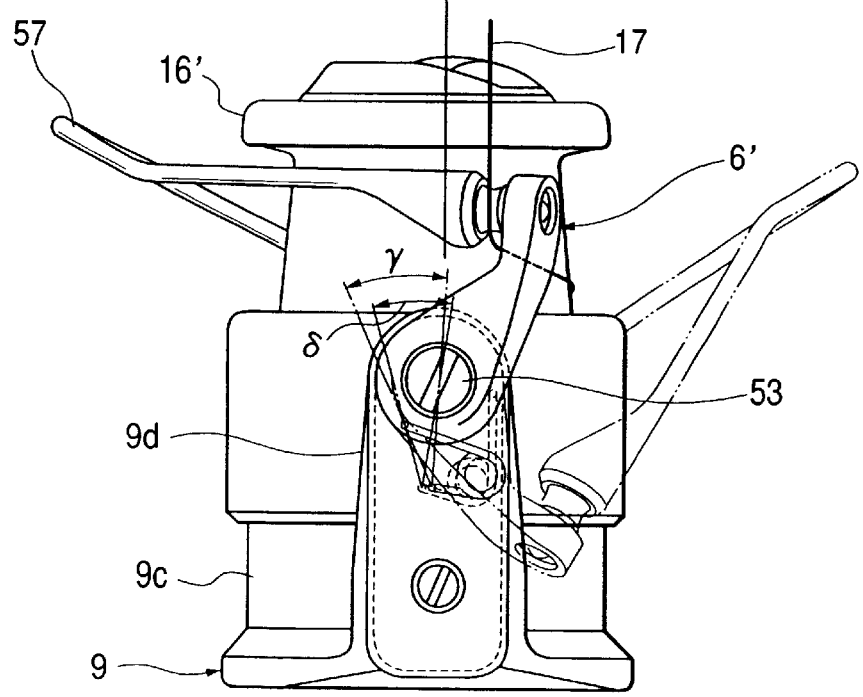
FIG. 8A is a plan view of a spool, a rotor and an operating member including one bail supporting member according to a fourth embodiment of the invention.

Next, a description will be given of a fourth embodiment of the invention with reference to FIGS. 8A and 8B.

According to the fourth embodiment, a hole 6j is bored in the back of the base 6c of the operating member 6' including the one bail supporting member so that the one end portion 7a of the urging member 7 may be inserted into and mated with the hole 6j. Further, a moving guide portion 9o including a long groove is bored in the support arm 9d of the rotor 9 so that the other end portion 7b of the urging member 7 may be inserted into and mated with the moving guide portion 9o.

The rest of the arrangement is substantially similar to what has been made in the second embodiment.

According to the fourth embodiment, the positions of the other end portion 7b of the urging member 7 mated with the moving guide portion 9o differ between the winding condition of the fishline and the playing-out condition of the fishline.

In the winding condition of the fishline, the other end portion of the urging member 7 shown by a broken line is mated with the left end of the moving guide portion 9o, wherein a represents a line connecting the center of the operating member 6' including the one bail supporting member and the center of the other end portion 7b of the urging member 7 shown by the broken line.

In the playing-out condition of the fishline, the other end portion 7b of the urging member 7 shown by a chain double-dashed line is mated with the right end of the moving guide portion 9o, wherein a' represents a line connecting the center of the operating member 6' including the one bail supporting member and the center of the other end portion 7b of the urging member 7 shown by the chain double-dashed line.

The dead point of the urging member 7 moves on the connecting line a and a'.

In this case, f represents a line connecting the center of the other end portion 7b of the urging member 7 shown by a broken line and the center of the one end portion 7a of the urging member 7 shown by a chain double-dashed line in the winding condition of the fishline.

Further, g represents a line connecting the center of the one end portion 7a of the urging member 7 shown by a chain double-dashed line and the center of the other end portion 7b of the urging member 7 shown by a chain double-dashed line in the playing-out condition of the fishline.

Given that the pivoting angle of the connecting lines a and f is $\gamma'$ and the pivoting angle of the connecting lines a' and g is $\delta'$, $\gamma'>\delta'$ is established. Providing the support arm 9d mated with the other end portion 7b of the urging member 7 with the moving guide portion 9o including the long groove causes a large pivoting angle to be secured as the other end portion 7b of the urging member 7 is displaced in the playing-out condition of the fishline, so that the urging force of the urging member 7 can be acted on strongly.

Fifth Embodiment

A description will be given of a fifth embodiment of the invention with reference to FIGS. 9A–11.

Figure 9B:
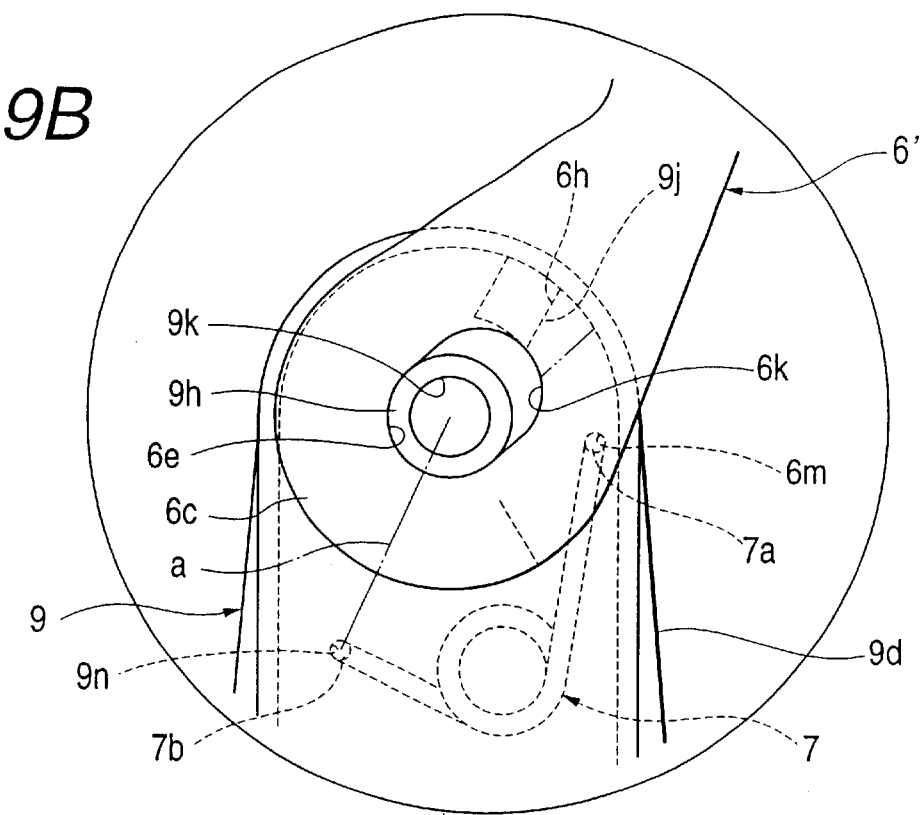
FIG. 9B is a partial enlarged plan view with the screws removed in the winding condition of a fishline.
Figure 9A:
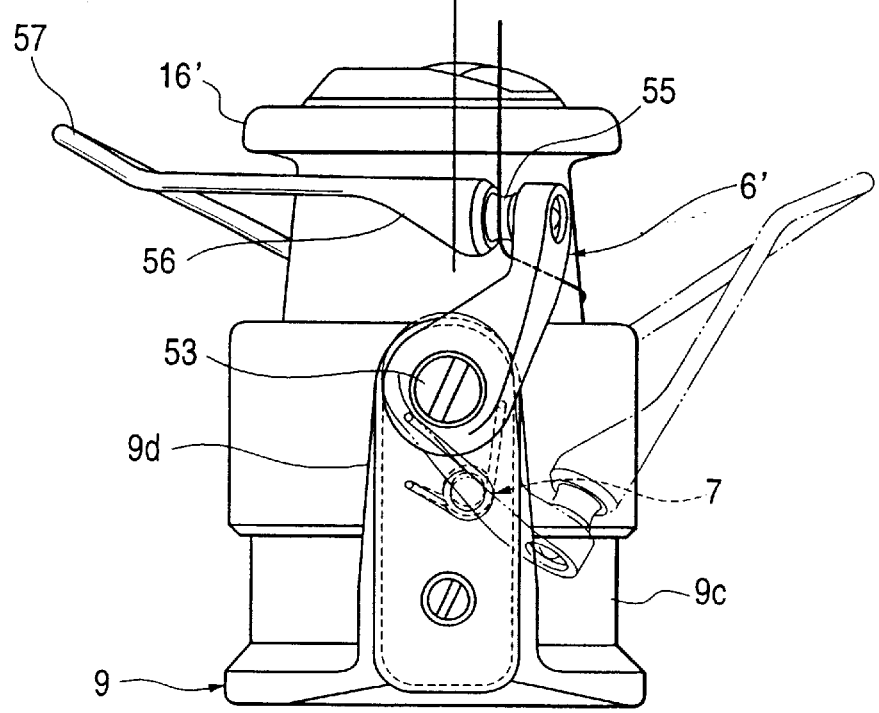
FIG. 9A is a plan view of a spool, a rotor and an operating member including one bail supporting member according to a fifth embodiment of the invention.
Figure 10:
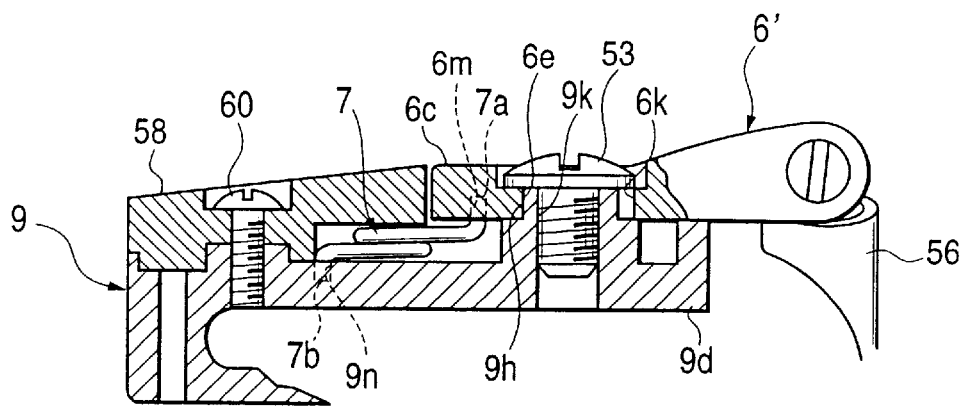
FIG. 10 is an enlarged sectional side view of the operating member including one support arm and the bail supporting member.

According to the fifth embodiment, as shown in FIG. 9B, the base 6c of the operating member 6' including the one bail supporting member is formed into a disk, and the through-hole 6e is formed in the center. An oval moving guide portion 6k including a through-hole continuously connected to the through-hole 6e is formed toward the right front in the winding condition of the fishline and the central through-hole 6e is urged toward and pressed against the rotary pivot 9h by the urging member 7 in the winding condition of the fishline.

A hole 6m is bored in the back of the base 6c of the operating member 6' including the one bail supporting member, and the one end portion 7a of the urging member 7 is inserted into and mated with the hole 6m. The other end portion 7b is inserted into and mated with a hole 9n bored in the support arm 9d of the rotor 9.

The rest of the arrangement is substantially similar to what has been made in the second embodiment.

According to the fifth embodiment, the central through-hole 6e of the operating member 6' including the one bail supporting member is urged toward and pressed against the rotary pivot 9h by the urging member 7 in the winding condition of the fishline. When the winding condition of the fishline is reversed to the playing-out condition of the fishline, the operating member 6' including the one bail supporting member is displaced toward the left and upwardly along the moving guide portion 6k as shown by an arrow h of FIG. 11 simultaneously with the reversion. Then the moving guide portion 6k including the through-hole is urged toward and pressed against the rotary pivot 9h by the urging member 7.

As shown in FIG. 9B, the dead point exists on a line a connecting the center of the operating member 6' including the one bail supporting member and the center of the other end portion 7b of the urging member 7.

Figure 11:
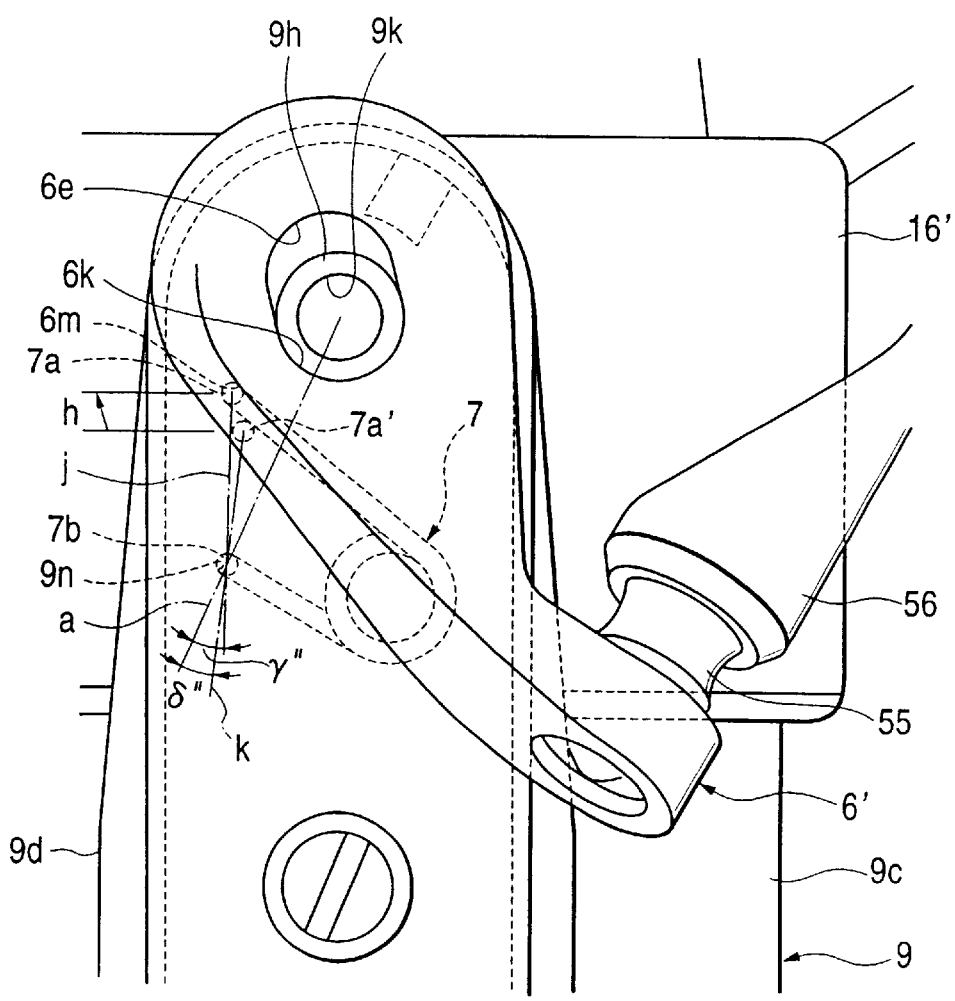
FIG. 11 is a partial enlarged plan view of the spool, the rotor and the operating member including the one bail supporting member with the screws removed in the playing-out condition of the fishline.

In the playing-out condition of the fishline of FIG. 11, j represents a line connecting the centers of the one end portion 7a of the urging member 7 and of the other end portion 7b of the urging member 7 shown by a broken line, and k represents a line connecting the centers of the other end portion 7b of the urging member 7 shown by the broken line and of the one end portion 7a' (the position of the one end portion of the conventional urging member) of the urging member 7 shown by a chain double-dashed line.

Given that the pivoting angle of the connecting lines a and j is $\gamma''$ and the pivoting angle of the connecting lines a and k is $\delta''$, $\gamma''>\alpha$ce is established. Forming the oval moving guide portion 6k including the central through-hole 6e and the through-hole continuously connected together in the operating member 6' including the one bail supporting member causes a large pivoting angle to be secured as the end portion 7a of the urging member 7 is displaced in the playing-out condition of the fishline, so that the urging force of the urging member 7 can be acted on strongly.

With the spinning reel for fishing thus arranged according to the fifth embodiment, the operating member 6' including the one bail supporting member is provided with the moving guide portion 6k including the through-hole continuously connected to the central through-hole 6e in combination of the rotary pivot 9h whereby to secure a large pivoting angle in the playing-out condition of the fishline by displacing the one end portion 7a of the urging member 7 including the dead point spring. In addition, the urging force of the urging member 7 can be acted on strongly with a simple construction. It is thus ensured to prevent not only error resets of the operating members 6' and 6" respectively including the bail supporting members because of the rotational force applied to the handle 36 with the inertia force at the time of casting the terminal tackle but also the shaking off of the bail 57 because of the inertia force.

Moreover, the operating force of the operating member 6' is not unnecessarily increased and the operability thereof is kept from being worsened because the wire of the urging member 7 need not be thickened.

Sixth Embodiment

Next, a description will be given of a sixth embodiment of the invention with reference to FIGS. 12A–14.

According to the sixth embodiment, an oval moving guide portion 9q including a central through-hole 9p and a through-hole continuously connected to the through-hole 9p is formed toward the left front in the position of the rotary pivot 9h of the one support arm 9d in the preceding embodiment.

There is formed a recessed portion 9r whose oval form is greater than that of the moving guide portion 9q including the central through-hole 9p and the through-hole in an inside surface in the central direction of the rotor of the one support arm 9d.

The base 6c of the operating member 6' including the bail supporting member is formed into a disk, and the screw 53 is inserted into the through-hole 6e bored in the center of the disk.

A rotary pivot 64 is displaceably inserted into the moving guide portion 9q including the central through-hole 9p and the through-hole.

The stepped pivotal portion 64a of the rotary pivot 64 is fitted in the through-hole 6e of the base 6c of the operating member 6' including the bail supporting member.

The circular collar portion of the rotary pivot 64 is inserted into the oval recessed portion 9r, and the screw 53 is screwed into the central screw hole 64b of the rotary pivot 64.

The rest of the arrangement is substantially similar to what has been made in the fifth embodiment.

According to the sixth embodiment, the rotary pivot 64 mounted on the operating member 61 including the one bail supporting member with the screw 53 is urged toward and pressed against the central through-hole 9p by the urging member 7. When the winding condition of the fishline is reversed to the playing-out condition of the fishline, the operating member 6' including the one bail supporting member is displaced toward the left front along the moving guide portion 9q as shown by an arrow h of FIG. 14 simultaneously with the reversion. Then the rotary pivot 64 is urged toward and pressed against the moving guide portion 9q including the through-hole by the urging member 7.

Figure 12B:
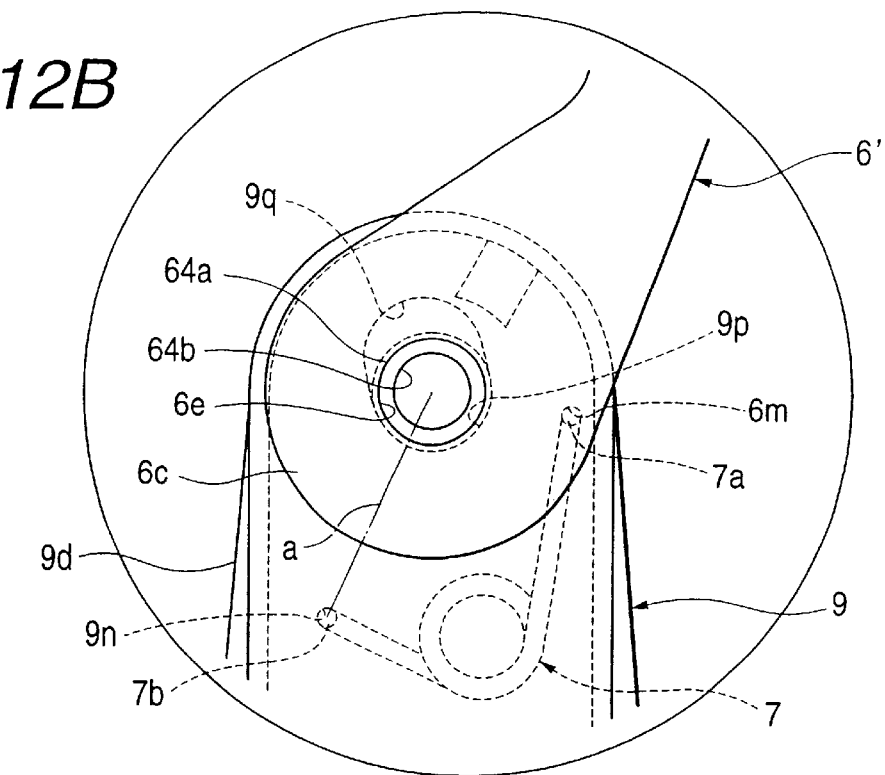
FIG. 12B is a partial enlarged plan view of FIG. 12A with the screws removed in the winding condition of the fishline.
Figure 12A:
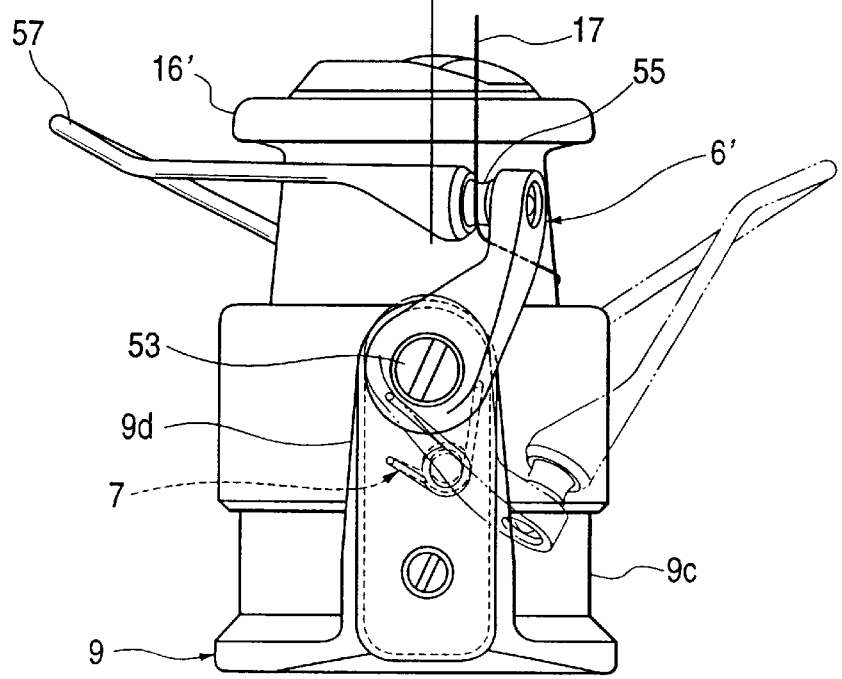
FIG. 12A is a plan view of a spool, a rotor and an operating member including one bail supporting member according to a sixth embodiment of the invention.
Figure 13:
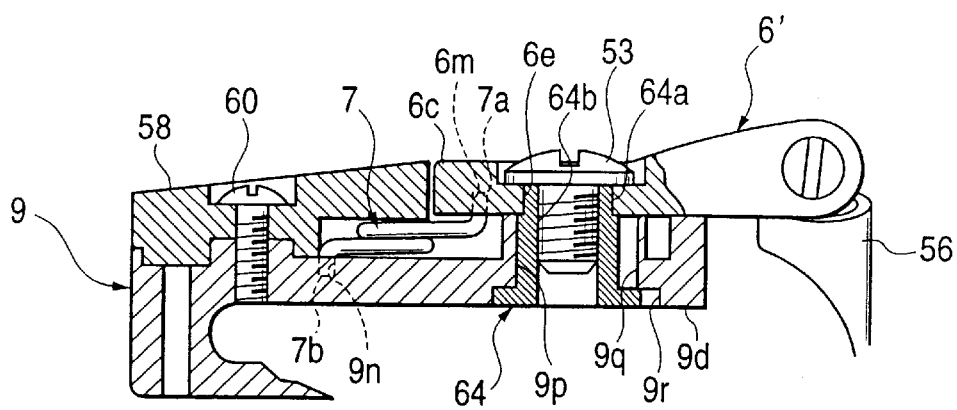
FIG. 13 is an enlarged sectional side view of the operating member including one support arm and the bail supporting member.

As shown in FIG. 12B, the dead point exists on a line a connecting the center of the operating member 6' including the one bail supporting member and the center of the other end portion 7b of the urging member 7 shown in a broken line.

Figure 14:
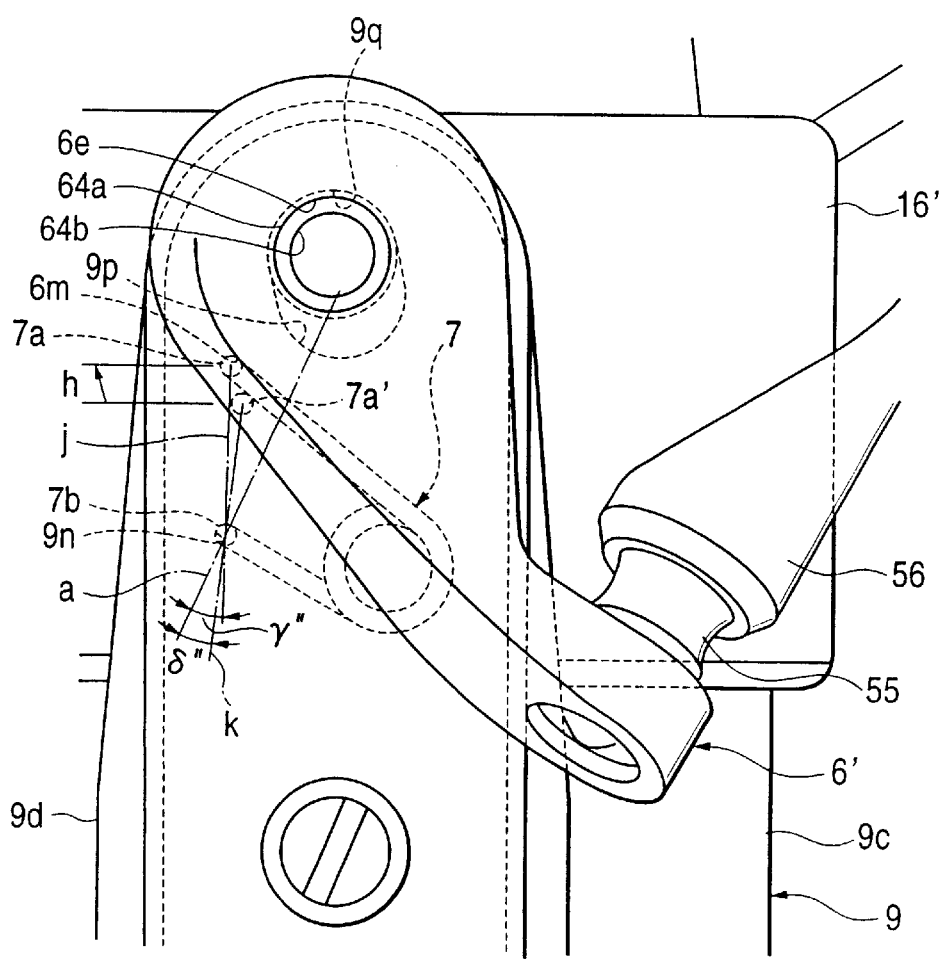
FIG. 14 is a partial enlarged plan view of the spool, the rotor and the operating member including the one bail supporting member with the screws removed in the playing-out condition of the fishline.

In the playing-out condition of the fishline of FIG. 14, j represents a line connecting the centers of the one end portion 7a and of the other end portion 7b of the urging member 7 shown by a broken line, and k represents a line connecting the centers of the other end portion 7b of the urging member 7 shown by the broken line and of the one end portion 7a' (the position of the one end portion of the conventional urging member) of the urging member 7 shown by a chain double-dashed line.

Given that the pivoting angle of the connecting lines a and j is γ" and the pivoting angle of the connecting lines a and k is δ", γ">δ" is established. Forming the oval moving guide portion 9q including the central through-hole 9p and the through-hole continuously connected together in the operating member 6' including the one bail supporting member toward the left front causes a large pivoting angle to be secured as the end portion 7a of the urging member 7 is displaced in the playing-out condition of the fishline, so that the urging force of the urging member 7 can be acted on strongly.

Seventh Embodiment

Figure 15B:
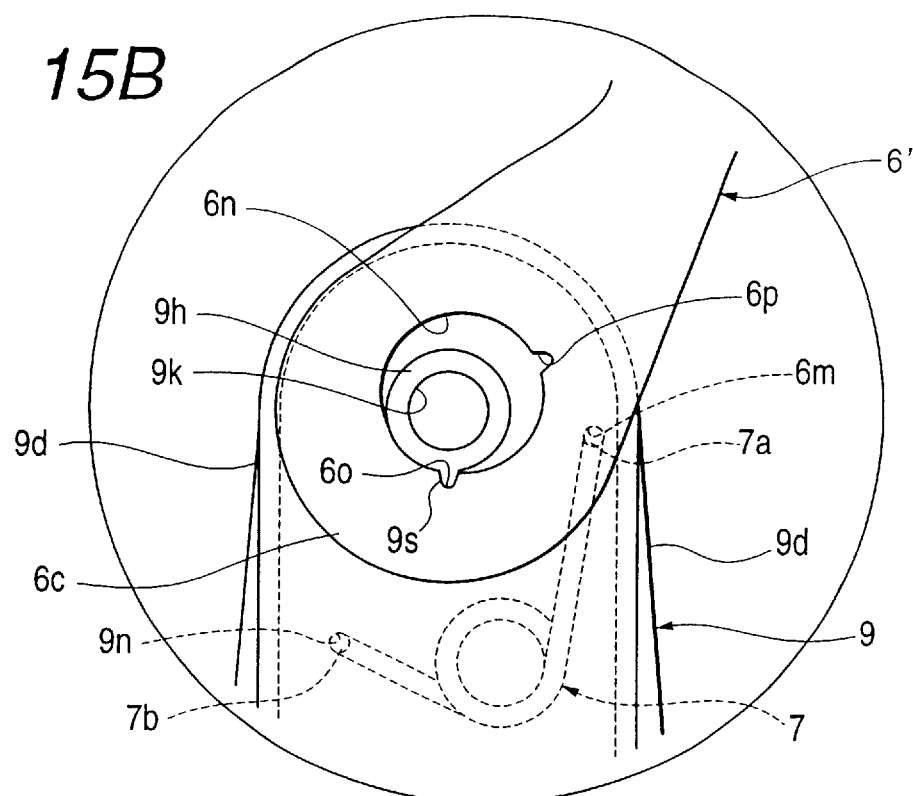
FIG. 15B is a partial enlarged plan view of FIG. 15A with the screws removed in the winding condition of the fishline.
Figure 15A:
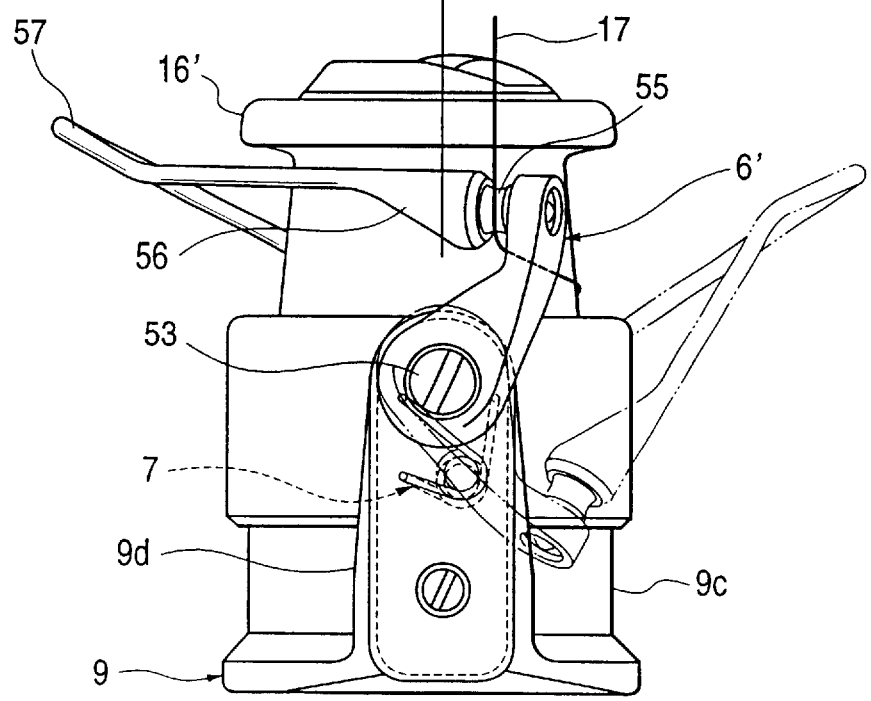
FIG. 15A is a plan view of a spool, a rotor and an operating member including one bail supporting member according to a seventh embodiment of the invention.

A description will be given of a seventh embodiment of the invention with reference to FIGS. 15A–16.

According to the seventh embodiment, the base 6c of the operating member 6' including the one bail supporting member is formed into a disk, and a moving guide portion 6n including a large-diameter through-hole is formed in an eccentric position from the center of the base 6c, recessed portions 6o and 6p being respectively formed in two places in the inner periphery thereof.

A projection 9s is formed on the outer periphery of the rotary pivot 9h of the one support arm 9d.

The rest of the arrangement is substantially similar to what has been made in the fifth embodiment.

According to the seventh embodiment, the moving guide portion 6n including the large-diameter through-hole of the operating member 6' including the one bail supporting member is urged toward and pressed against the rotary pivot 9h by the urging member 7, and the recessed portion 6o is retained by the projection 9s in the winding condition of the fishline. When the winding condition of the fishline is reversed to the playing-out condition of the fishline, the operating member 6' including the one bail supporting member is displaced forward as shown by an arrow i simultaneously with the reversion. Then the moving guide portion 6n including the large-diameter through-hole is urged toward and pressed against the rotary pivot 9h by the urging member 7, and the recessed portion 6p is retained by the projection 9s.

Figure 16:
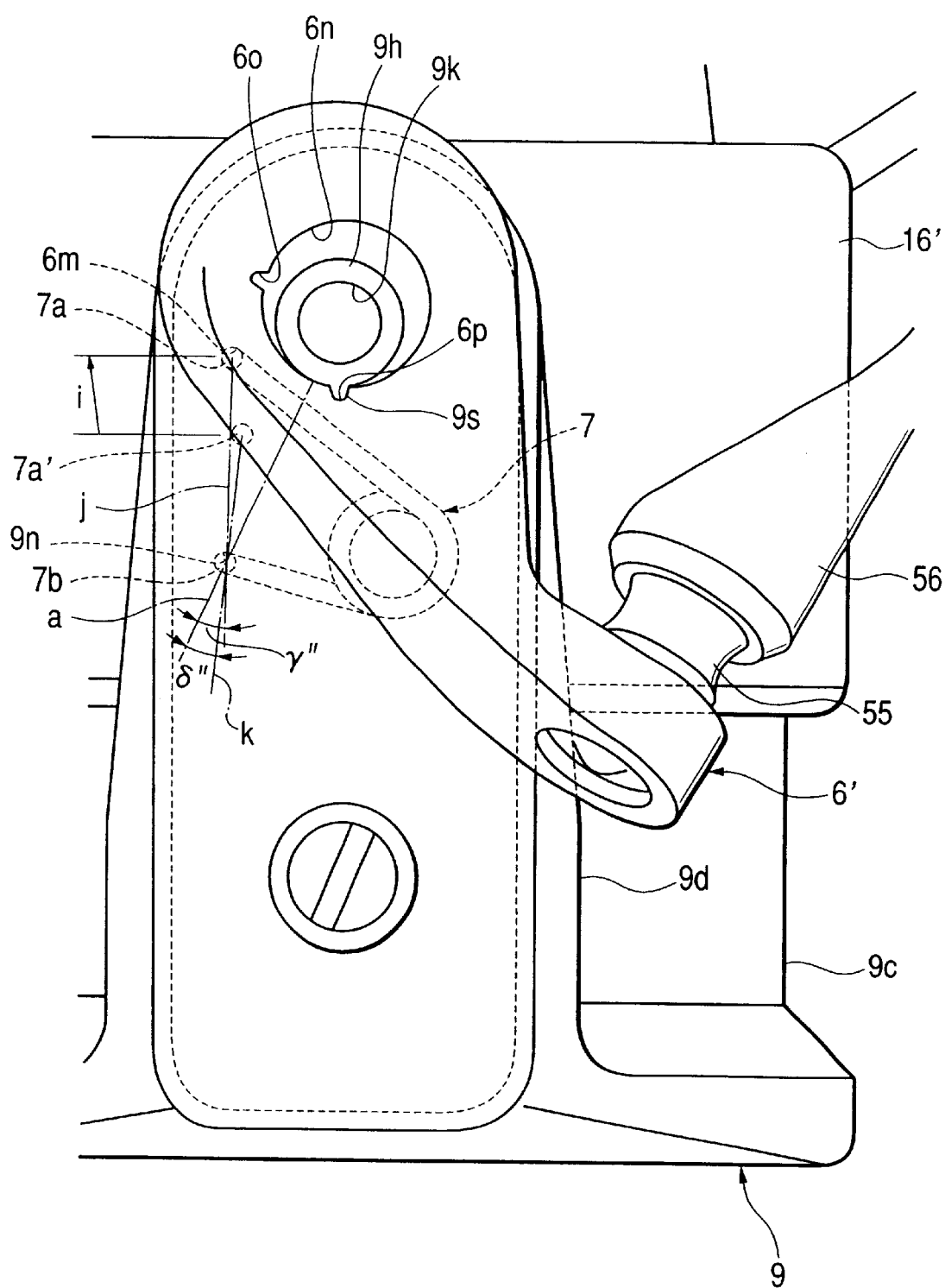
FIG. 16 is a partial enlarged plan view of the spool, the rotor and the operating member including the one bail supporting member with the screws removed in the playing-out condition of the fishline.

As shown in FIG. 16, the dead point exists on a line a connecting the center of the operating member 6' including the one bail supporting member and the center of the other end portion 7b of the urging member 7.

In the playing-out condition of the fishline of FIG. 16, j represents a line connecting the centers of the one end portion 7a and of the other end portion 7b of the urging member 7 shown by a broken line, and k represents a line connecting the centers of the other end portion 7b of the urging member 7 shown by the broken line and of the one end portion 7a (the position of the one end portion of the conventional urging member) of the urging member 7 shown by a chain double-dashed line.

Given that the pivoting angle of the connecting lines a and j is γ" and the pivoting angle of the connecting lines a and k is δ', γ">δ" is established. Forming the moving guide portion 6n including the large-diameter through-hole of the operating member 6' including the one bail supporting member causes a large pivoting angle to be secured as the end portion 7a of the urging member 7 is displaced in the playing-out condition of the fishline, so that the urging force of the urging member 7 can be acted on strongly.

The long groove formed as the moving guide portion in the description given in the preceding embodiments may be replaced with a slot.

Eighth Embodiment

A description will be given of an eighth embodiment of the invention with reference to FIGS. 17–18F.

A moving guide portion 60 including a substantially semicircular arc groove which projects toward the rotary shaft core of the operating member 6' and diametrically opened outward is bored in the back of the base 6c of the operating member 6' including the one bail supporting member. Regulating portions 6p and 6q are so formed as to project into the groove on the respective sides of the moving guide portion 6o, and the bumping projection 6h is projected from the back of the base 6c.

The one end portion 7a of the urging member 7 including the dead point spring is inserted into and mated with the moving guide portion 6o, whereas the other end portion 7b is inserted into and mated with the hole 9n bored in the support arm 9d.

The rest of the arrangement is substantially similar to what has been made in the second embodiment.

Figure 17:
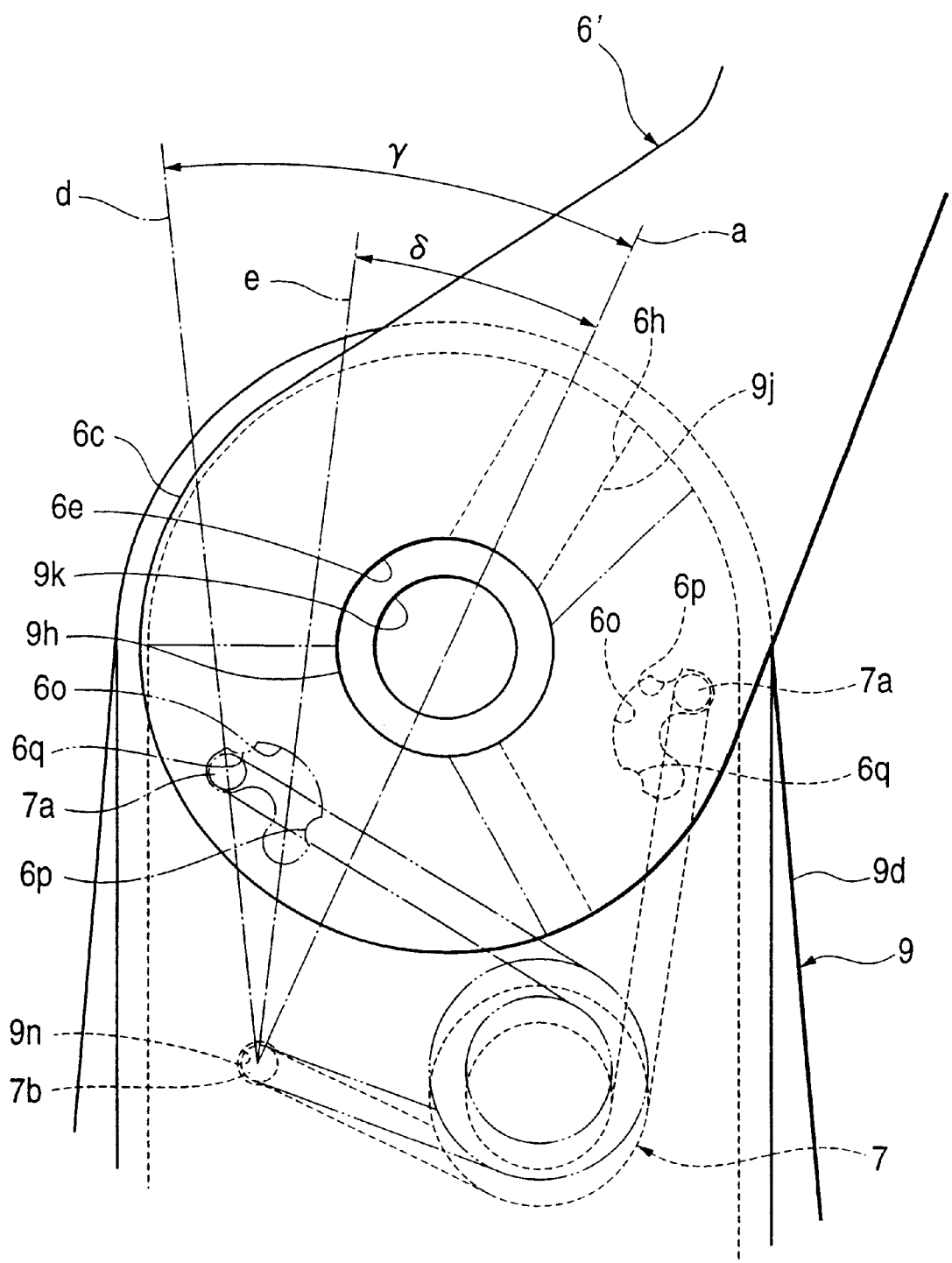
FIG. 17 is an enlarged plan view of the main part including an operating member including one bail supporting member and a support arm according to an eighth embodiment of the invention.

As shown in FIG. 17, the dead point exists on a line a connecting the center of the operating member 6' including the one bail supporting member and the center of the other end portion 7b of the urging member 7.

The moving guide portion 6o, which is shown by a broken line, of the operating member 6' shown by a solid line is situated in the position of the broken line on the right side of the base 6c in the winding condition of the fishline, and the one end portion 7a of the urging member 7 shown by the broken line is mated with the end of the counterclockwise direction of the moving guide portion 6o.

The moving guide portion 6g of the operating member 6' shown by a chain double-dashed line is situated in the position of the chain double-dashed line on the left side of the base 6c of the moving guide portion 6o in the playing-out condition of the fishline, and the one end portion 7a of the urging member 7 shown by the chain double-dashed line is displaced to and mated with the end of the clockwise direction of the moving guide portion 6o.

In the playing-out condition of the fishline of FIG. 17, d represents a line connecting the centers of the one end portion 7a and the other end portion 7b of the urging member 7 shown by the chain double-dashed line, and e represents a line connecting the centers of the one end portion 7a (the position of the one end portion of the conventional urging member) at the end of the counterclockwise direction of the moving guide portion 6o shown by the chain double-dashed line and of the other end portion 7b of the urging member 7.

Given that the pivoting angle of the connecting lines a and d is γ and the pivoting angle of the connecting lines a and e is δ, γ>δ is established. Providing the moving guide portion 6o including the substantially semicircular arc groove to the operating member 6' causes a large pivoting angle to be secured as the one end portion 7a of the urging member 7 including the dead point spring is displaced in the playing-out condition of the fishline, so that the urging force of the urging member 7 can be acted on strongly.

Figure 18A:
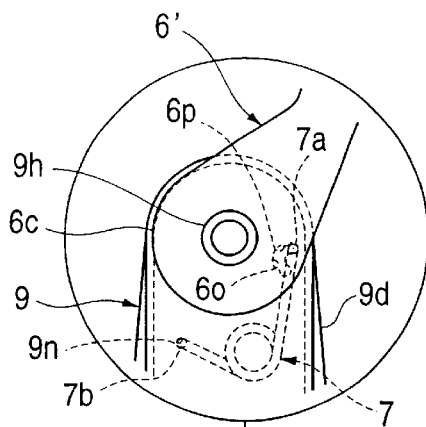
FIGS. 18A to 18F are plan views showing the process of reversing the support arm.
Figure 18F:
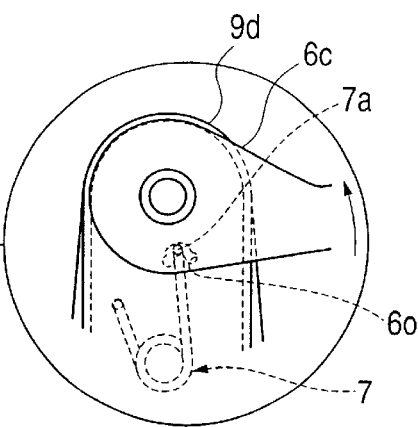
Figure 18B:
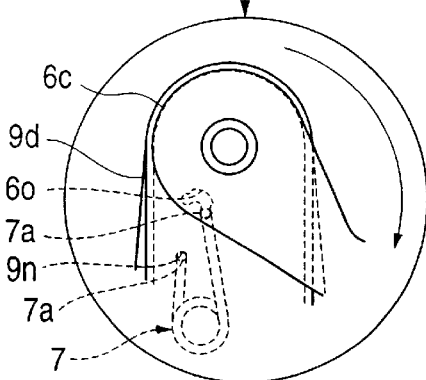
Figure 18E:
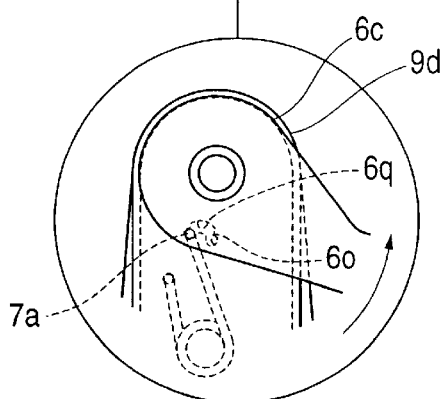
Figure 18C:
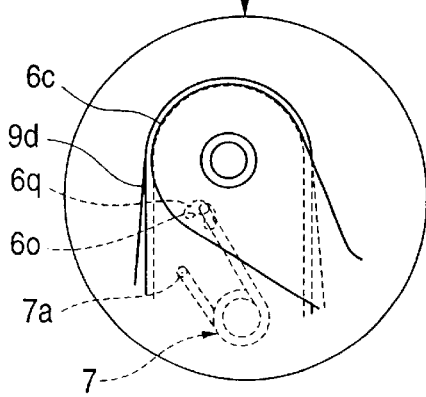
Figure 18D:
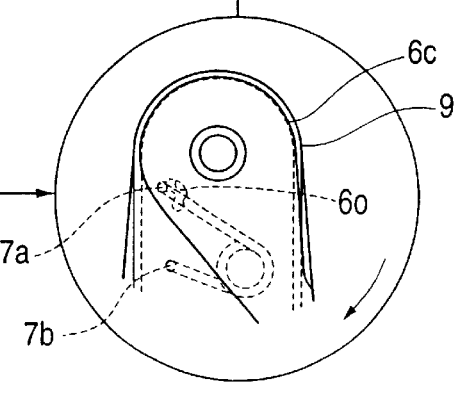

The operation of the operating member 6' including the one bail supporting member is such that when the winding condition of the fishline shown in FIG. 18A is switched to the playing-out condition of the fishline shown in FIG. 18D, the bail 57 is set up by the hand, so that the one end portion 7a is switched to the playing-out condition of the fishline of FIG. 18D via the conditions of FIGS. 18B and 18C.

When the operating member 6' including the one bail supporting member is reversed from the playing-out condition of the fishline shown in FIG. 18D to the winding condition of the fishline shown in FIG. 18A, the rotor 9 is rotated by the handle 36, and the operating member 6' including the one bail supporting member abuts against the abutment member 58 before being reversed, so that the one end portion 7a is reversed from the playing-out condition of the fishline of FIG. 18D to the winding condition of the fishline of FIG. 18A via the conditions of FIGS. 18E and 18F.

When the aforementioned switching and reversion occurs, the one end portion 7a will not move simultaneously with the pivoting of the operating member 6' including the one bail supporting member since it has been controlled by the regulating portions 6p and 6q on both sides of the moving guide portion 6o but will start moving after the operating member 6' including the bail supporting member is pivoted by a predetermined amount.

As set forth above, providing the back of the base 6c of the operating member 6' including the bail supporting member with the moving guide portion 6o including the substantially semicircular arc groove causes a large pivoting angle to be secured as the one end portion 7a of the urging member 7 including the dead point spring is displaced in the playing-out condition of the fishline, so that the urging force of the urging member 7 can be acted on strongly. Consequently, the bail 57 in the playing-out condition of the fishline is restrained from being reversed to the winding condition of the fishline even when the rotational force is applied to the handle 36 with the inertia force at the time of casting the terminal tackle.

The operating force of the operating member 6' is not unnecessarily increased and the operability thereof is kept from being worsened because the wire of the urging member 7 need not be thickened.

Moreover, the shaking off of the bail 57 is prevented because of the inertia force at the time of casting the terminal tackle.

Since the regulating portions 6p and 6q on the respective sides of the moving guide portion 60 make the one end portion 7a of the urging member 7 start moving after the operating member 6' including the one bail supporting member is pivoted by a predetermined amount, the bail 57 is restrained from being reversed with the inertia force, an impact or the like.

With the spinning reel for fishing thus arranged as described above, the operating member 6' including the one bail supporting member is provided with the moving guide portion 60 including the substantially semicircular arc groove whereby to secure a large pivoting angle in the playing-out condition of the fishline by displacing the one end portion 7a of the urging member 7 including the dead point spring, so that the urging force of the urging member 7 can be acted on strongly with a simple construction. It is thus ensured to prevent not only error resets of the operating members 6' and 6" respectively including the bail supporting members because of the rotational force applied to the handle 36 with the inertia force at the time of casting the terminal tackle but also the shaking off of the bail 57 because of the inertia force.

Further, the operating force of the operating member 6' is not unnecessarily increased and the operability thereof is kept from being worsened because the wire of the urging member 7 need not be thickened.

Moreover, since the regulating portions 6p and 6q on the respective sides of the moving guide portion 6o make the one end portion 7a of the urging member 7 start moving after the operating member 6' including the one bail supporting member is pivoted by a predetermined amount, the bail 57 is restrained from being reversed with the inertia force, an impact or the like.

The present invention is implemented in the mode as set forth above and has the following effects.

Firstly, the operating member is provided with the moving guide portion including the arcuate long hole whereby to secure a large pivoting angle in the playing-out condition of the fishline by displacing one end portion of an urging member including the dead point spring, so that the urging force of the urging member can be acted on strongly with a simple construction. Thus, the operating force of the operating member is not unnecessarily increased because the wire of the urging member need not be thickened to ensure that error reset of a clutch operating mechanism is made preventable.

Second, the operating member 6' including one bail supporting member is provided with the moving guide portion 6g including the arcuate long hole whereby to secure a large pivoting angle in the playing-out condition of the fishline by displacing the one end portion of the urging member including the dead point spring, so that the urging force of the urging member can be acted on strongly with a simple construction. It is thus ensured to prevent not only error resets of the operating members respectively including bail supporting members because of the rotational force applied to the handle with the inertia force at the time of casting a terminal tackle but also the shaking off of the bail because of the inertia force.

Moreover, the operating force of the operating member is not unnecessarily increased and the operability thereof is kept from being worsened because the wire of the urging member need not be thickened.

Third, the operating member including the one bail supporting member is provided with the moving guide portion including the through-hole continuously connected to the central through-hole in combination of the rotary pivot whereby to secure a large pivoting angle in the playing-out condition of the fishline by displacing the one end portion of the urging member including the dead point spring, so that the urging force of the urging member can be acted on strongly with a simple construction. It is thus ensured to prevent not only error resets of the operating members respectively including the bail supporting members because of the rotational force applied to the handle with the inertia force at the time of casting the terminal tackle but also the shaking off of the bail because of the inertia force.

As it is unnecessary to thicken the wire of the urging member, the operability of the operating member is never worsened because unnecessarily greater operating force is not required for the operating member.

Fourth, providing the moving guide portion including the substantially semicircular arc groove to the operating member causes a large pivoting angle to be secured as the one end portion of the urging member including the dead point spring is displaced in the playing-out condition of the fishline, so that the urging force of the urging member can be acted on strongly with a simple construction. It is thus ensured to prevent not only error resets of the operating members respectively including the bail supporting members because of the rotational force applied to the handle with the inertia force at the time of casting the terminal tackle but also the shaking off of the bail because of the inertia force.

As it is unnecessary to thicken the wire of the urging member, the operability of the operating member is never worsened because unnecessarily greater operating force is not required for the operating member.

Moreover, since the regulating portions on the respective sides of the moving guide portion make the one end portion of the urging member start moving after the operating member including the one bail supporting member is pivoted by a predetermined amount, the bail is restrained from being reversed with the inertia force, an impact or the like.

While only certain embodiments of the invention have been specifically described herein, it will apparent that numerous modifications may be made thereto without departing from the spirit and scope of the invention.

What is claimed is:

1. A reel for fishing, comprising:
    an operating member actuating one of linear and rotating movements;
    an urging member applying an urging force to said operating member beyond a dead point;
    a moving guide portion provided on at least one of said operating member and a reel body, said moving guide portion supporting the displacement of an end portion of said urging member so as to increase the urging force of said urging member at one of operating positions of the ON and OFF operations of said operating member, said urging member being directly connected to and between said operating member and said reel body, wherein the end portion of said urging member is received displaceably within said moving guide portion.

2. The reel for fishing according to claim 1, wherein said urging member is a spring.

3. A reel for fishing comprising:
    an operating member actuating one of linear and rotating movements;
    an urging member applying an urging force to said operating member beyond a dead point;
    a moving guide portion provided on at least one of said operating member and a reel body, said moving guide portion supporting the displacement of an end portion of said urging member so as to increase the urging force of said urging member at one of operating positions of the ON and OFF operations of said operating member, said urging member being directly connected to and between said operating member and said reel body;
    wherein said operating member is pivotally supported, and said moving guide portion is in the form of a substantially circular arc groove to allow displacement of said end portion of said urging member there within.

4. A reel for fishing according to claim 3, further comprising:
    regulating portions formed as to project into said circular arc groove adjacent respective sides thereof, for regulating the movement of the end portion of said urging member.

5. A reel for fishing, comprising:
    a bail supporting member having a fishline guide portion;
    a rotor interlockingly rotatable with a handle, said rotor having a support arm reversibly supporting with said bail supporting member in a forepart thereof;
    an urging member urging and holding said bail supporting member so that said bail supporting member is reversibly assigned to one of the fishline winding and playing-out conditions; and
    a moving guide portion provided on at least one of said support arm of said rotor and said bail supporting member, said moving guide portion supporting the displacement of an end portion of said urging member so as to increase the urging force to said bail supporting member when said bail supporting member is positioned in the fishline playing-out condition, said urging member being directly connected to and disposed between said support arm of said rotor and said bail supporting member, wherein the end portion of said urging member is received displacably within said moving guide portion.

6. The reel for fishing according to claim 5, wherein said urging member is a spring.

7. A reel for fishing comprising:

a bail supporting member having a fishline guide portion;

a rotor interlockingly rotatable with a handle, said rotor having a support arm reversibly supporting with said bail supporting member in a forepart thereof;

an urging member urging and holding said bail supporting member so that said bail supporting member is reversibly assigned to one of the fishline winding and playing-out conditions; and a moving guide portion provided on at least one of said support arm of said rotor and said bail supporting member, said moving guide portion supporting the displacement of an end portion of said urging member so as to increase the urging force to said bail supporting member when said bail supporting member is positioned in the fishline playing-out condition, said urging member being directly connected to and disposed between said support arm of said rotor and said bail supporting member;

wherein said moving guide portion is in the form of a substantially circular arc groove to allow displacement of said end portion of said urging member there within.

8. A reel for fishing according to claim 7, further comprising:

regulating portions formed as to project into said circular arc groove adjacent respective sides thereof, for regulating the movement of the end portion of said urging member.

9. A reel for fishing, comprising:

a bail supporting member having a fishline guide portion;

a rotor interlockingly rotatable with a handle, said rotor having a support arm reversibly supporting with said bail supporting member in a forepart thereof;

an urging member urging and holding said bail supporting member so that said bail supporting member is reversibly assigned to one of the fishline winding and playing-out conditions;

a rotary pivot provided on one of said bail supporting member and said support arm of said rotor, a moving guide portion provided on the other of said bail supporting member and said support arm of said rotor, said moving guide portion radially displacing said rotary pivot relatively so as to increase the urging force to said bail supporting member when said bail supporting member is positioned in the fishline playing-out condition, wherein said urging member being directly connected to and disposed between said support arm of said rotor and said bail supporting member and an end portion of said urging member is received displacably within said moving guide portion.

10. The reel for fishing according to claim 9, wherein said urging member is a spring.

11. A fishing reel comprising:

a bail supporting member having a fishline guide portion;

a rotor interlockingly rotatable with a handle, said rotor having a support arm reversibly supporting with said bail supporting member in a forepart thereof;

an urging member urging and holding said bail supporting member so that said bail supporting member is reversibly assigned to one of the fishline winding and playing-out conditions;

a rotary pivot provided on one of said bail supporting member and said support arm of said rotor, a moving guide portion provided on the other of said bail supporting member and said support arm of said rotor, said moving guide portion radially displacing said rotary pivot relatively so as to increase the urging force to said bail supporting member when said bail supporting member is positioned in the fishline playing-out condition, wherein said urging member being directly connected to and disposed between said support arm of said rotor and said bail supporting member, and said moving guide portion is in the form of a substantially oval groove.

12. A reel for fishing, comprising:

a shaft portion;

an operating member rotatable around said shaft portion, said operating member performing the switching between ON and OFF conditions;

an urging member applying an urging force to said operating member beyond a dead point; and a moving guide portion provided on at least one of said operating member and a reel body side portion, for receiving one of an end portion of said urging member and said shaft portion, said moving guide portion providing the displacement of the end portion of said urging member so as to keep the end portion thereof from a position of the dead point of said urging member in one of the ON and OFF conditions, to thereby increase the urging force of said urging member, said urging member being directly connected to and disposed between said operating member and said reel body side portion, wherein the end portion of said urging member is received displacably within said moving guide portion.

13. A reel for fishing according to claim 12, wherein, in a double-bearing type fishing reel, said reel body side portion is a reel main body, and said operating member activates a clutch mechanism so as to perform an engagement and disengagement of a spool shaft with a pinion.

14. A reel for fishing according to claim 12, wherein in a spinning reel, said reel body side portion is a support arm of a rotor interlockingly rotatable with a handle, and said operating member is a bail supporting member reversibly supported to said support arm of said rotor so as to switch between a fishline winding condition and a fishline playing-out condition.

15. The reel for fishing according to claim 12, wherein said urging member is a spring.

16. A reel for fishing comprising:

a bail supporting member having a fishline guide portion;

a rotor interlockingly rotatable with a handle, said rotor having a support arm reversibly supporting with said bail supporting member in a forepart thereof;

an urging member urging and holding said bail supporting member so that said bail supporting member is reversibly assigned to one of the fishline winding and playing-out conditions;

a rotary pivot provided on one of said bail supporting member and said support arm of said rotor, a moving guide portion provided on the other of said bail supporting member and said support arm of said rotor, said moving guide portion radially displacing said rotary pivot relatively so as to increase the urging force to said bail supporting member when said bail supporting member is positioned in the fishline playing-out condition, wherein said urging member being directly connected to and disposed between said support arm of said rotor and said bail supporting member and said moving guide portion is in the form of a substantially circular arc groove to allow displacement of said one of said end portion and said shaft portion there within.

17. A reel for fishing according to claim 16, further comprising: regulating portions formed as to project into said circular arc groove adjacent respective sides thereof, for regulating the movement of the end portion of said urging member.

18. A reel for fishing comprising:

a shaft portion;

an operating member rotatable around said shaft portion, said operating member performing the switching between ON and OFF conditions;

an urging member applying an urging force to said operating member beyond a dead point; and a moving guide portion provided on at least one of said operating member and a reel body side portion, for receiving one of an end portion of said urging member and said shaft portion, said moving guide portion providing the displacement of the end portion of said urging member so as to keep the end portion thereof from a position of the dead point of said urging member in one of the ON and OFF conditions, to thereby increase the urging force of said urging member wherein in a spinning reel, said reel body side portion is a support arm of a rotor interlockingly rotatable with a handle, and said operating member is a bail supporting member reversibly supported to said support arm of said rotor so as to switch between a fishline winding condition and a fishline playing-out condition, and wherein said shaft portion is provided on one of said bail supporting member and said support arm of said rotor, said moving guide portion is provided on the other of said bail supporting member and said support arm of said rotor, and said moving guide portion is disposed around said shaft portion so as to radially displace a rotary pivot.

19. A reel for fishing according to claim 18, wherein said moving guide portion is in the form of a substantially oval.

* * * * *